(12) United States Patent
Yamasaki et al.

(10) Patent No.: US 9,461,522 B2
(45) Date of Patent: Oct. 4, 2016

(54) DRIVE UNIT AND ELECTRIC POWER STEERING DEVICE INCLUDING THE DRIVE UNIT

(71) Applicant: DENSO CORPORATION, Kariya, Aichi-pref. (JP)

(72) Inventors: Masashi Yamasaki, Obu (JP); Takeshi Sawada, Gifu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/812,415

(22) Filed: Jul. 29, 2015

(65) Prior Publication Data
US 2016/0036288 A1 Feb. 4, 2016

(30) Foreign Application Priority Data

Jul. 31, 2014 (JP) .................................. 2014-156474
Jun. 3, 2015 (JP) .................................. 2015-113196

(51) Int. Cl.
| | |
|---|---|
| H02K 1/32 | (2006.01) |
| H02K 5/22 | (2006.01) |
| B62D 5/04 | (2006.01) |
| H02K 9/22 | (2006.01) |

(Continued)

(52) U.S. Cl.
CPC .............. H02K 5/225 (2013.01); B62D 5/0412 (2013.01); B62D 5/0463 (2013.01); H02K 9/22 (2013.01); H02K 11/0005 (2013.01); H02K 11/0073 (2013.01); H02K 11/02 (2013.01); H02K 11/33 (2016.01)

(58) Field of Classification Search
CPC .... H02K 11/33; H02K 5/225; H02K 11/048; H02K 9/22; H02K 11/30
USPC ................................. 310/64, 71, 68 D, 68 R
See application file for complete search history.

(56) References Cited

U.S. PATENT DOCUMENTS

| | | | |
|---|---|---|---|
| 2008/0236964 A1 | 10/2008 | Kikuchi et al. | |
| 2011/0254387 A1* | 10/2011 | Matsuda .............. | B62D 5/0406 310/43 |
| 2011/0285225 A1* | 11/2011 | Matsuda .............. | B62D 5/0406 310/64 |

(Continued)

FOREIGN PATENT DOCUMENTS

JP    4-355602 A    12/1992

OTHER PUBLICATIONS

U.S. Appl. No. 14/812,757, filed Jul. 29, 2015, Yamasaki, et al.

(Continued)

*Primary Examiner* — Thanh Lam
(74) *Attorney, Agent, or Firm* — Knobbe, Martens, Olson & Bear, LLP

(57) ABSTRACT

A drive unit that includes a rotating electric machine having a stator with winding wound on the stator and with a shaft rotating within the stator, and a rotor rotatable relative to the stator. The drive unit also includes a controller holding member disposed on one end of the rotating electric machine, and a controller having a substrate fixed to the controller holding member, a heat generation element mounted on a heat generation element mounting surface. The drive unit further includes a power supply connector connecting the substrate and a power supply, and a ground line coupled to a ground terminal of the power supply providing a conductive connection to the controller holding member via the substrate and the power supply connector. With this structure, the drive unit's common mode noise may be reduced.

10 Claims, 16 Drawing Sheets

(51) Int. Cl.
*H02K 11/00* (2016.01)
*H02K 11/02* (2016.01)

(56) References Cited

U.S. PATENT DOCUMENTS

| 2012/0160596 A1* | 6/2012 | Yamasaki | B62D 5/0406 180/443 |
| 2012/0286604 A1* | 11/2012 | Abe | H02K 5/225 310/71 |
| 2013/0187517 A1* | 7/2013 | Asao | H02K 1/185 310/68 D |
| 2014/0035445 A1* | 2/2014 | Uryu | H02K 11/33 310/68 D |

OTHER PUBLICATIONS

U.S. Appl. No. 14/812,886, filed Jul. 29, 2015, Yamasaki.
U.S. Appl. No. 14/812,866, filed Jul. 29, 2015, Kawata, et al.
U.S. Appl. No. 14/812,807, filed Jul. 29, 2015, Kawata, et al.
U.S. Appl. No. 14/812,769, filed Jul. 29, 2015, Kadoike, et al.
U.S. Appl. No. 14/812,730, filed Jul. 29, 2015, Yamanaka, et al.
U.S. Appl. No. 14/812,753, filed Jul. 29, 2015, Kabune.
U.S. Appl. No. 14/812,733, filed Jul. 29, 2015, Yamasaki, et al.
U.S. Appl. No. 14/812,767, filed Jul. 29, 2015, Hayashi.

* cited by examiner

DRIVE UNIT AND ELECTRIC POWER STEERING DEVICE INCLUDING THE DRIVE UNIT

CROSS REFERENCE TO RELATED APPLICATION

The present application is based on and claims the benefit of priority of Japanese Patent Application No. 2014-156474, filed on Jul. 31, 2014, and No. 2015-113196, filed on Jun. 3, 2015, the disclosure of which are incorporated herein by reference.

TECHNICAL FIELD

The present disclosure generally relates to a drive unit and an electric power steering device including the drive unit.

BACKGROUND INFORMATION

A conventional structure of an electric motor used in a vehicle is noise-prone, i.e., a gap between a coil of the motor and a motor case serving as a capacitor to generate a noise. Such a noise may be prevented by the following structure. For example, in a patent document, Japanese Patent Laid-Open No. H4-355602A, (Patent document 1) the generated noise is released via a common mode path, which is provided as a connection of the motor parts and the vehicle body, that is, a grounding of the motor case and a heat sink to a vehicle body frame.

In the patent document 1, the noise affecting the controller is reduced by connecting the motor case and the heat sink to the vehicle body frame, and, as a trade-off, the noise leaking out from the motor increases. Further, the noise leaking out from the motor case and the heat sink of the motor is a common mode noise, and there is no knowledge about what path such a noise takes toward an outside of the motor. Therefore, the noise leaking out from the motor case and the heat sink of the motor is transmitted to an antenna of a radio, and to a communication device, etc., which may cause a radio noise.

SUMMARY

It is an object of the present disclosure to provide a motor, or a drive unit, having a noise reduction capability, and an electric power steering using such a drive unit.

In an aspect of the present disclosure, the drive unit is provided with a rotating electric machine having a stator with winding wound on the stator and with a shaft rotating within the stator, and a rotor rotatable relative to the stator. The drive unit also includes a controller holding member disposed on one end of the rotating electric machine, and a controller.

The controller has a substrate fixed to the controller holding member, a heat generation element mounted on a heat generation element mounting surface, which is a controller holding member side surface of the substrate that enables heat dissipation from the heat generation element to the controller holding member, and electronic components mounted on an electronic component mounting surface of the substrate, opposite to the heat generation element mounting surface.

The drive unit further includes a power supply connector connecting the substrate and a power supply, and a ground line coupled to a ground terminal of the power supply providing a conductive connection to the controller holding member via the substrate and the power supply connector. In such configuration, even when a stray capacitance between the controller holding member and the substrate serves as a noise propagation path, i.e., even when the generated noise propagates via such a path, such a noise returns to the power supply ground line via the power supply connector. Therefore, the noise caused by the stray capacitance is considered as a normal mode noise. In other words, the configuration of the present disclosure is enabling that the noise otherwise causing the common mode noise is collected, is returned, to the power supply as a normal mode noise.

Therefore, by the reduction of the common mode noise in the above-described manner, the noise reduction configuration for reducing the common mode noise is simplified. Further, in a situation that a drive unit and an in-vehicle radio co-exist in one vehicle, the radio noise is reduced due to the reduction of the motor noise, i.e., the reduction of the noise leaking out from the drive unit via the controller holding member.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Hereafter, the drive unit in the present disclosure and the electric power steering are described with reference to the drawings.

First Embodiment

The drive unit in the first embodiment of the present disclosure and the electric power steering device are shown in FIGS. 1-12. Hereafter, in all embodiments described in the following, the same numerals represent the same parts, for the brevity of the description.

Figure 1:
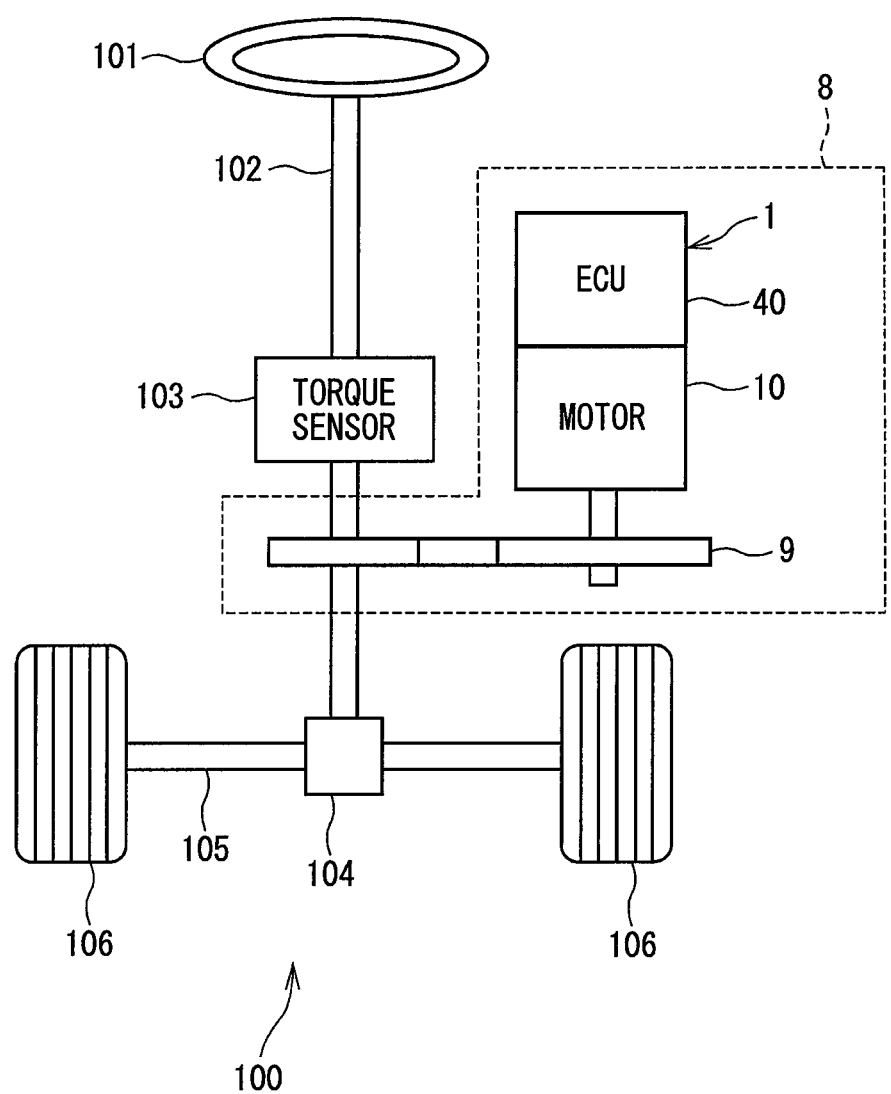
FIG. 1 is a system diagram of an electric power-steering in a first embodiment of the present disclosure.

As shown in FIG. 1, a drive unit 1 is applied to an electric power steering device 8 for assisting the steering operation by the driver. The drive unit 1 is a one-body combination of a motor 10 serving as a rotating electric machine and an ECU 40 serving as a controller for controlling the motor 10.

FIG. 1 shows a system diagram of a steering system 100 having the electric power steering device 8. The steering system 100 comprises a steering wheel 101, a column shaft 102, a pinion gear 104, a rack shaft 105, wheels 106, and the electric power steering device 8 etc. respectively serving as a component of the system.

The steering wheel 101 is connected to the column shaft 102. The column shaft 102 has a torque sensor 103 disposed thereon, which is used for detecting a steering torque which is input thereto when the driver operates the steering wheel 101. At a tip of the column shaft 102, the pinion gear 104 is disposed, which is engaged with the rack shaft 105. On both ends of the rack shaft 105, a pair of wheels 106 is disposed via a tie rod and the like.

Thereby, when the driver rotates the steering wheel 101, the column shaft 102 connected to the steering wheel 101 rotates. The rotational movement of the column shaft 102 is turned into a translational movement of the rack shaft 105 by the pinion gear 104, and the pair of wheels 106 are steered by an angle according to an amount of displacement of the rack shaft 105.

The electric power steering device 8 is provided with a speed reduction gear 9 serving as a power transmission section and the drive unit 1. The electric power steering device 8 outputs the assisting torque from the motor 10 based on the signals from the torque sensor 103 and the vehicle speed obtained from Control Area Network (CAN) which is not illustrated, and transmits the torque to the column shaft 102 via the speed reduction gear 9, for assisting the steering operation of the steering wheel 101. That is, the electric power steering device 8 of the present embodiment is what is designated as a "column assistance" type, which assists a rotation of the column shaft 102 with the torque generated by the motor 10. However, the device 8 may also be used as a "rack assistance" type, which assists the drive of the rack shaft 105. In other words, the column shaft 102 serving as "a drive object" in the present embodiment may be replaced with other objects, e.g., with the rack shaft 105.

Figure 2:
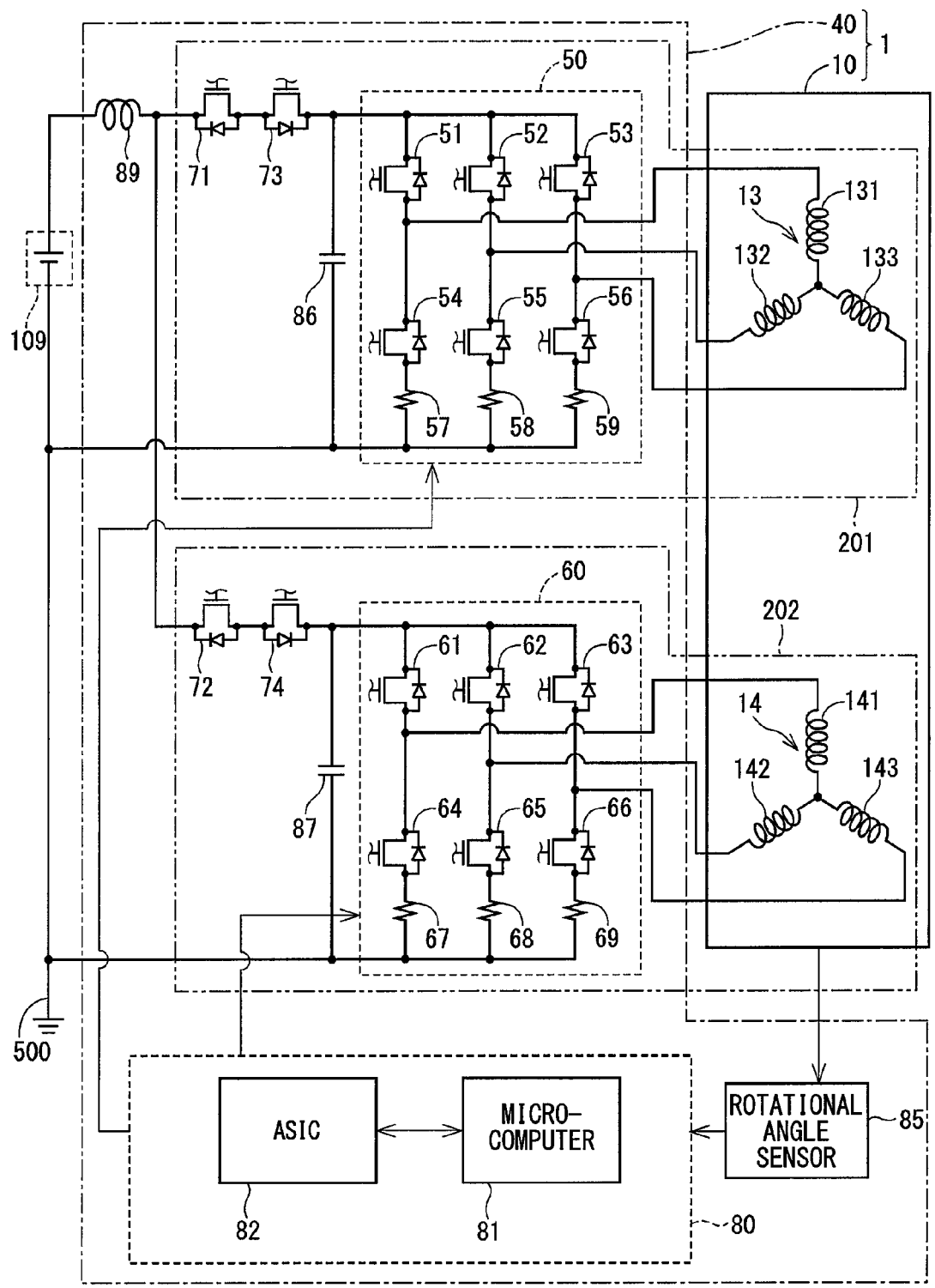
FIG. 2 is a schematic diagram of a circuit configuration of a drive unit in the first embodiment of the present disclosure.

Next, the electrical configuration of the electric power steering device 8 is described based on FIG. 2. In FIG. 2, for the readability of the drawing, some control lines etc. are omitted therefrom.

The motor 10 is a three-phase brushless motor, and has a first winding group 13 and a second winding group 14 respectively wound on a stator 12 which are mentioned later.

The first winding group 13 comprises a U phase coil 131, a V phase coil 132, and a W phase coil 133. The second winding group 14 comprises a U phase coil 141, a V phase coil 142, and a W phase coil 143.

According to the present embodiment, the first winding group 13 and the second winding group 14 respectively correspond to a "winding."

The ECU 40 is provided with a first inverter part 50, a second inverter part 60, power relays 71, 72, reverse connection protection relays 73 and 74, a control unit 80, a rotational angle sensor 85, capacitors 86 and 87, and a choke coil 89 serving as a coil member, which are respectively mounted on a substrate 41 mentioned below. In the present embodiment, the electronic components which constitute the ECU 40 are mounted on one substrate 41. In such configuration, the number of components in the ECU 40 is reduced in comparison to a case where plural substrates 41 are used, thereby reducing the volume of the ECU 40.

The first inverter part 50 has six switching (SW) elements 51-56 combined in a bridge connection form, for the switching of the power supply to the first winding group 13. The second inverter part 60 has six SW elements 61-66 in a bridge connection form, for the switching of the power supply to the second winding group 14.

Although the SW elements 51-56, 61-66 of the present embodiment are Metal Oxide Semiconductor Field Effect Transistor (MOSFET), other elements such as Insulated Gate Bipolar Transistor (IGBT) and the like may also be used.

As for the SW elements 51, 52, and 53 arranged on the high potential side of the first inverter part 50, the drain is connected to a positive electrode of a battery 109 that serves as a power supply, and the source is connected to the drain of the SW elements 54, 55, and 56 arranged on the low potential side.

The source of the SW elements 54, 55, and 56 is connected to a negative electrode of the battery 109 via current detection elements 57, 58, and 59. The junction points between the SW elements 51, 52, 53 on the high potential side and the SW elements 54, 55, 56 on the low potential side are connected to the U phase coil 131, the V phase coil 132, and the W phase coil 133, respectively.

As for the SW elements 61, 62, and 63 arranged on the high potential side of the second inverter part 60, the drain is connected to the positive electrode of the battery 109, and the source is connected to the drain of the SW elements 64, 65, and 66 arranged on the low potential side.

The source of SW elements 64, 65, 66 is connected to the negative electrode of the battery 109 via current detection elements 67, 68, and 69. The junction points between the SW elements 61, 62, 63 on the high potential side and the SW elements 64, 65, 66 on the low potential side are connected to the U phase coil 141, the V phase coil 142, and the W phase coil 143, respectively.

The current detection elements 57, 58, and 59 are disposed on the low potential side of the SW elements 54-56 respectively corresponding to the three phases of the first winding group 13, for detecting the electric current in each of the three phases of the first winding group 13.

The current detection elements 67, 68, and 69 are disposed on the low potential side of the SW elements 64-66 respectively corresponding to the three phases of the second winding group 14, for detecting the electric current in each of the three phases of the second winding group 14.

The current detection elements 57-59, 67-69 of the present embodiment are implemented as shunt resistors.

The power relay 71 is disposed at a position between the battery 109 and the first inverter part 50, and conducts or intercepts the electric current between the battery 109 and the first inverter part 50.

The power relay 72 is disposed at a position between the battery 109 and the second inverter part 60, and conducts or intercepts the electric current between the battery 109 and the second inverter part 60.

The reverse connection protection relay 73 is disposed at a position between the power relay 71 and the first inverter part 50. The reverse connection protection relay 74 is disposed at a position between the power relay 72 and the second inverter part 60.

The reverse connection protection relays 73 and 74 prevent the electric current flowing in a reverse direction for the protection of the ECU 40, when, e.g., in the case when the battery 109 is connected in reverse, by having a parasitic diode connected in reverse relative to the power relays 71, 72.

In the present embodiment, the power relays 71, 72 and the reverse connection protection relays 73, 74 are all MOSFETS. However, other semiconductor elements such as IGBT and the like may also be used as those relays. In the present embodiment, the power relays 71, 72, and the reverse connection protection relays 73, 74, correspond to a "relay."

The control unit 80 has a microcomputer 81, which serves as an electronic component and a calculation circuit, and an Application Specific Integrated Circuit (ASIC) 82, which serves as an Integrated Circuit (IC) circuit, together with other parts, which are integrated circuit components.

The microcomputer 81 calculates an instruction value concerning the power supply to the first winding group 13 and the second winding group 14 based on the signal from the torque sensor 103 or the rotational angle sensor 85 and the like.

The ASIC 82 comprises a pre-driver, a signal amplifier, a regulator, and the like. The pre-driver generates a driving signal based on the instruction value, and outputs the generated driving signal to the first inverter part 50 and to the second inverter part 60. More practically, the pre-driver outputs the generated driving signal to the gate of the SW elements 51-56, 61-66. By the switching operation of the SW elements 51-56, 61-66 according to the driving signal, an AC current according to the instruction value is supplied to the first winding group 13 and to the second winding group 14 from the first inverter part 50 and the second inverter part 60, respectively. Thereby, the motor 10 is driven.

The signal amplifier amplifies the detection signal (i.e., a voltage between both terminals in the present embodiment) of the current detection elements 57-59, 67-69, and the detection value of the rotational angle sensor 85, and outputs them to the microcomputer 81. Further, the regulator is a stabilization circuit which stabilizes the voltage supplied to the microcomputer 81 and the like.

The rotational angle sensor 85 includes a magnetism detection element, and detects a rotation angle of a rotor 15 by detecting a rotating magnetic field from a magnet 18 provided on an other end 162 of a shaft 16 mentioned later.

The capacitor 86 is connected in parallel with the first inverter part 50. The capacitor 87 is connected in parallel with the second inverter part 60. In the present embodiment, the capacitors 86 and 87 are the aluminum electrolytic capacitors, and are disposed on the inverter side (i.e., on one side close to the inverter parts 50, 60) of the relays 71-74. The choke coil 89 is connected at a position between the battery 109 and the positive electrodes of the capacitors 86 and 87. In the present embodiment, the choke coil 89 is disposed on the battery side (i.e., on one side close to the battery 109) of the relays 71-74. The capacitors 86 and 87 and the choke coil 89 serve as a filter circuit, reducing the noise transmitted from the drive unit 1 to the other devices that share the power supply from the battery 109 with the drive unit 1, and also reducing the noise transmitted from the other devices back to the drive unit 1 sharing the battery 109. The capacitors 86 and 87 store the electric charge, and support the electric power supply to the first inverter part 50 and the second inverter part 60.

The ground terminal of the battery 109 is connected to the ground line. Hereafter, the ground line connected to the ground terminal of the battery 109 is designated as a "power supply ground line 500."

In the present embodiment, the first inverter part 50, the power relay 71, the reverse connection protection relay 73, and the capacitor 86 are grouped as a first system 201, corresponding to the first winding group 13. Further, the second inverter part 60, the power relay 72, the reverse connection protection relay 74, and the capacitor 87 are grouped as a second system 202, corresponding to the second winding group 14. That is, a drive control of the motor 10 is performed in plural systems, i.e., in two systems in the present embodiment.

Figure 3:
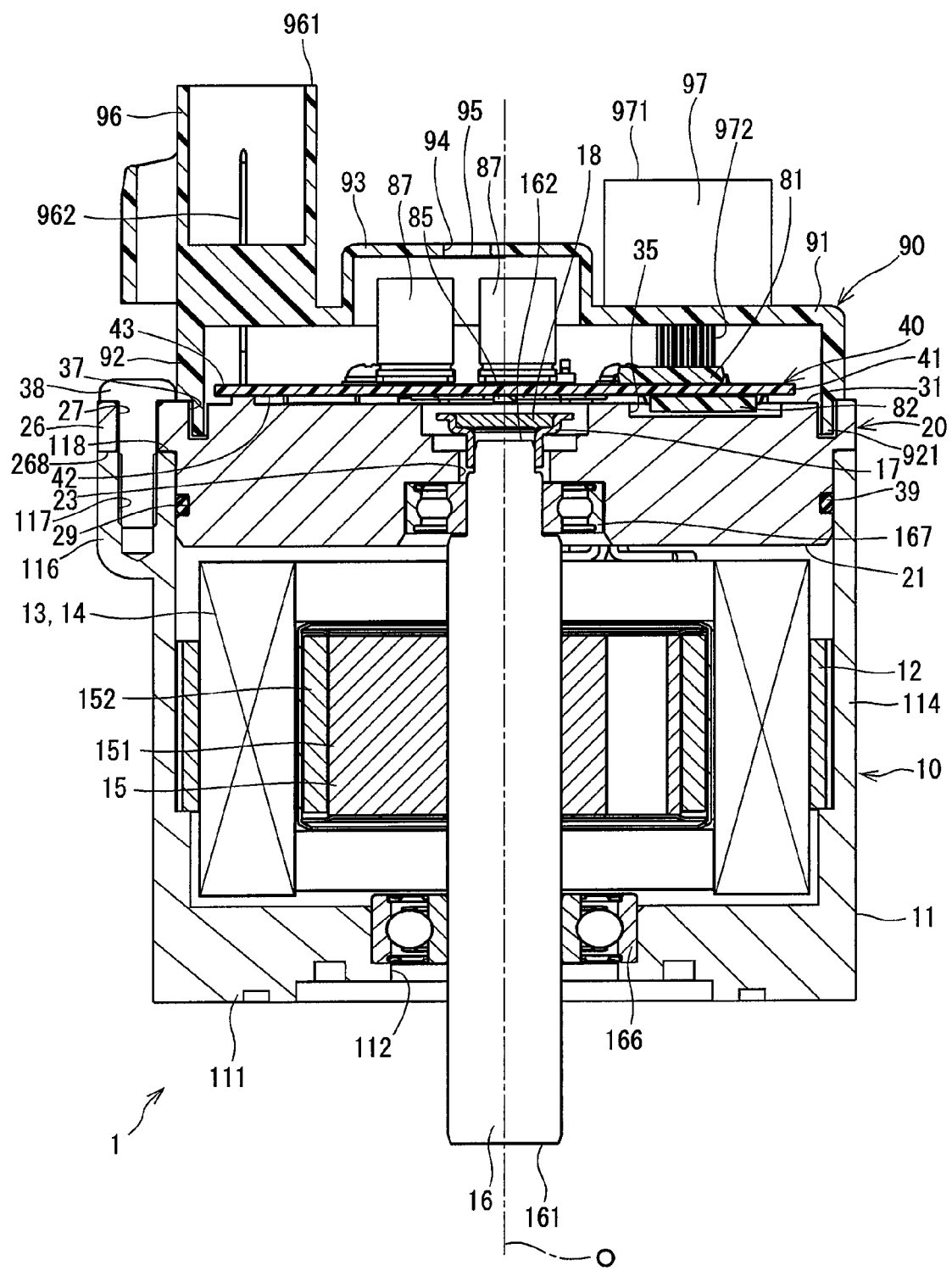
FIG. 3 is a sectional view of the drive unit in the first embodiment of the present disclosure.
Figure 4:
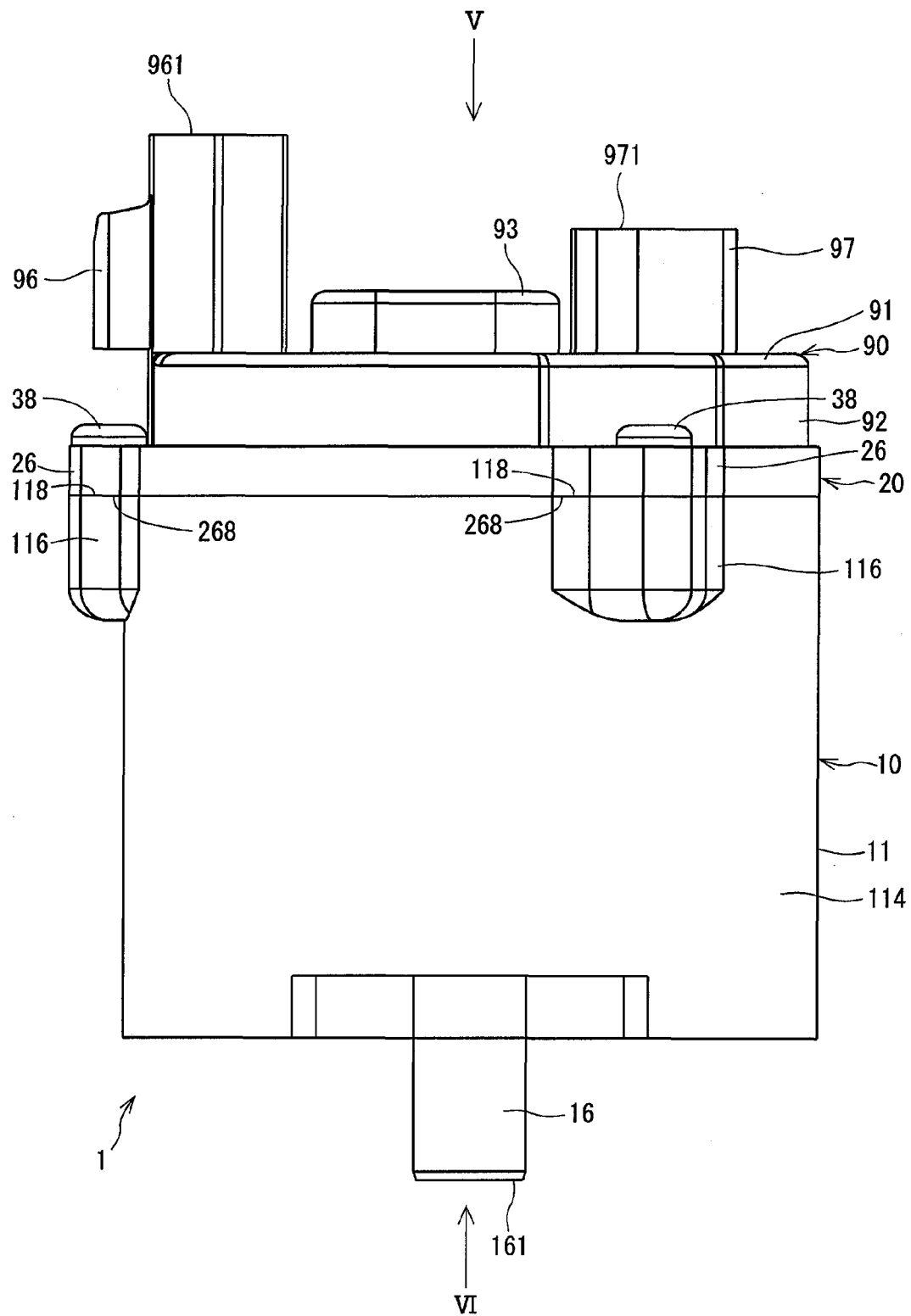
FIG. 4 is a side view of the drive unit in the first embodiment of the present disclosure.
Figure 5:
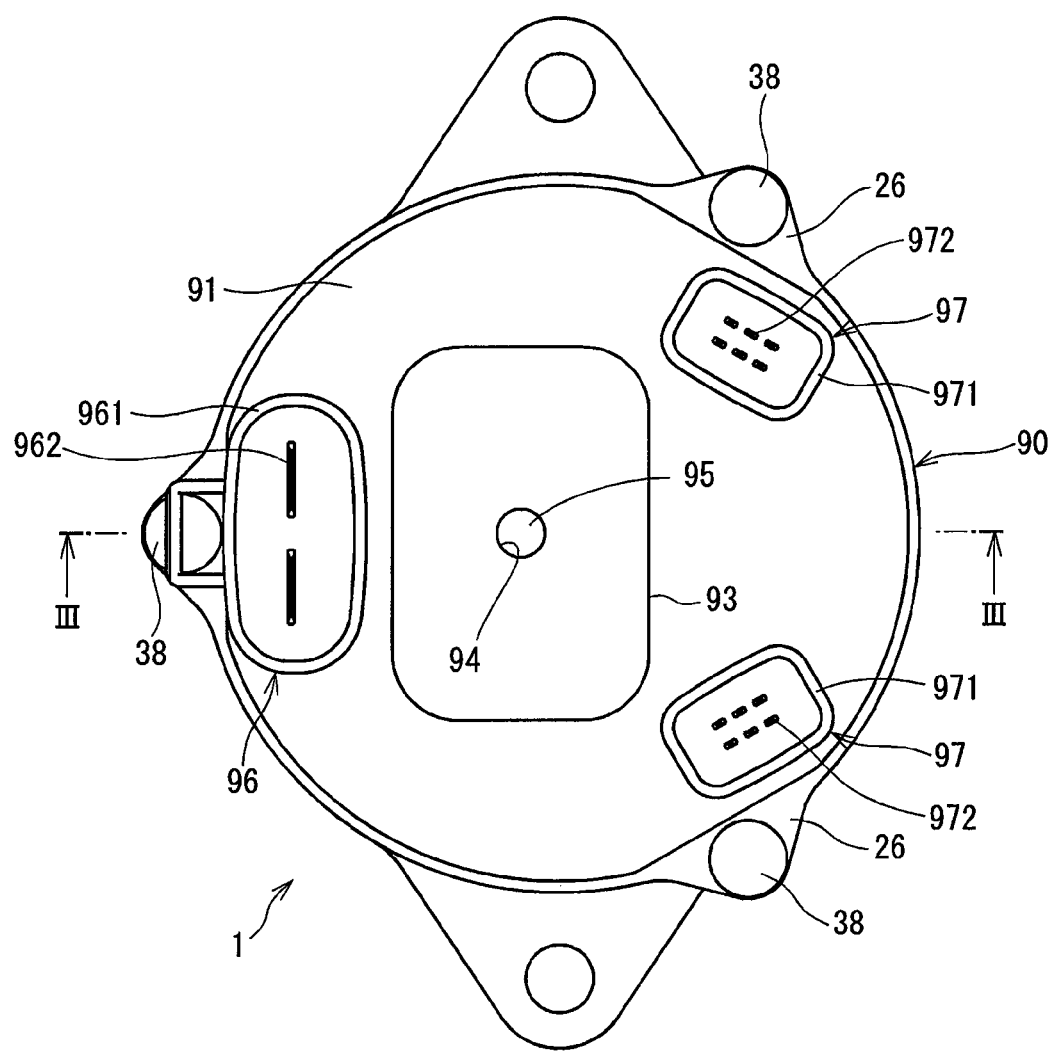
FIG. 5 is a top view of the drive unit along an arrow V in FIG. 4.
Figure 6:
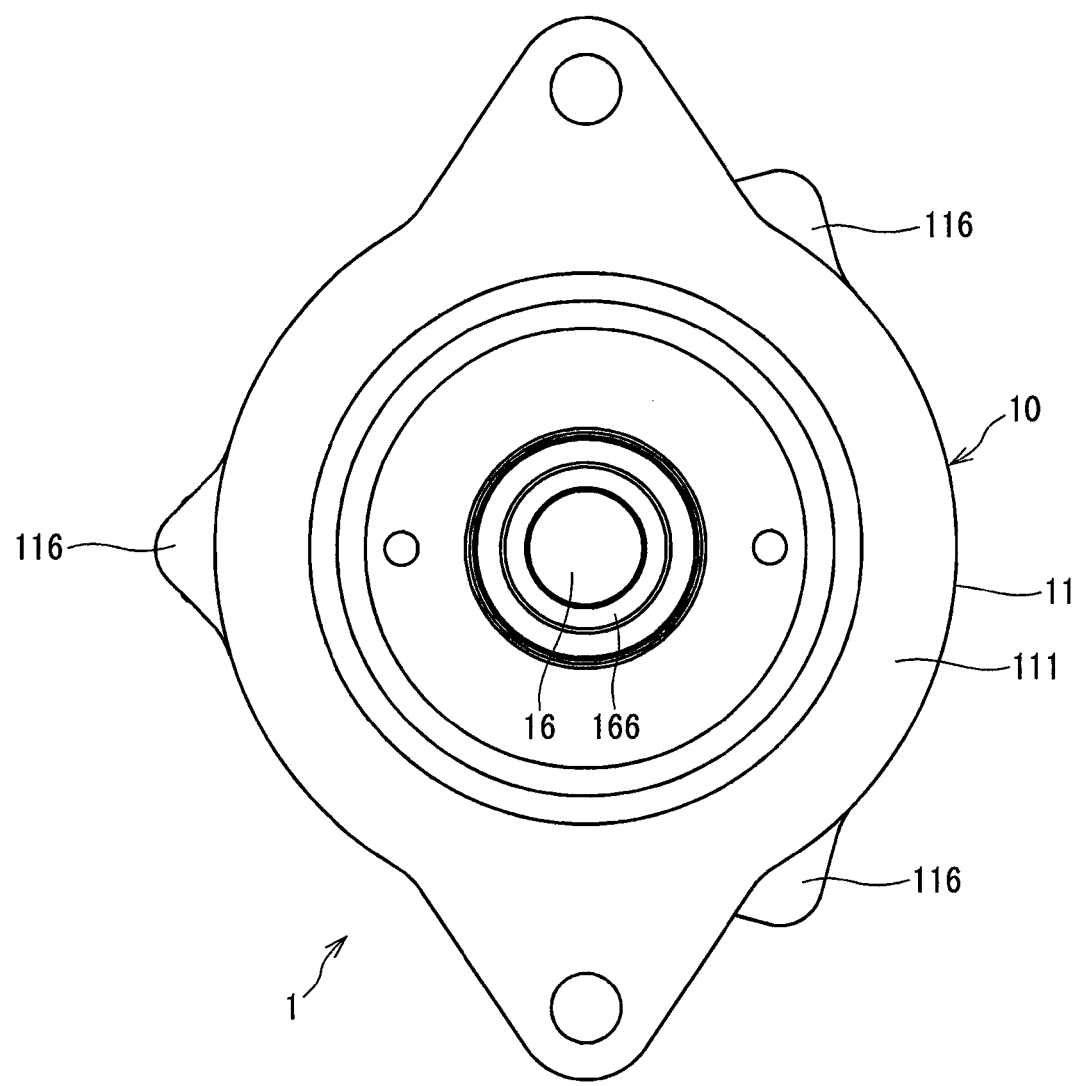
FIG. 6 is a bottom view of the drive unit along an arrow VI in FIG. 4.

Next, a structure of the drive unit 1 is described based on FIGS. 3-11. In the following, an axial direction of the motor 10 may simply be designated as an "axial direction," and a radius direction of the motor 10 may simply be designated as a "radius direction." FIG. 3 is a sectional view along a line of FIG. 5.

As shown in FIGS. 3-8, the drive unit 1 is provided with the motor 10, a frame member 20 serving as a controller holding member, the ECU 40, and a power supply connector 96 together with other parts.

As shown in FIG. 3, the motor 10 has a motor case 11 serving as casing of the motor 10, a stator 12, the first winding group 13, the second winding group 14, the rotor 15, the shaft 16 and other parts.

The motor case 11 has a bottom part 111 and a cylinder part 114, for example, is formed in a cylinder shape closed on one end, i.e., having a bottom on one end, and is made from metal, such as aluminum. The motor case 11 of the present embodiment is made from aluminum, and, as for the surface of the case 11, the anodized aluminum treatment is performed. The bottom part 111 of the motor case 11 is positioned away from the ECU 40, i.e., on an opposite side, and an opening of the motor case 11 is close to the ECU 40, i.e., on the ECU side. In the present embodiment, the cylinder part 114 corresponds to a "cylinder part of the rotating electric machine", and a projection area of the cylinder part 114 along the axial direction is a "motor region."

A shaft hole 112 into which one end 161 of the shaft 16 is inserted is disposed substantially at the center of the bottom part 111. Further, a bearing 166 is fitted to the bottom part 111.

On or around the opening of the cylinder part 114, a fixing tab 116 for fixedly disposing the frame member 20 is formed, i.e., projecting outward from an outer wall of the cylinder part 114. The fixing tab 116 has a screw-threaded hole 117 bored thereon. The fixing tab 116 of the present embodiment is disposed at three positions around the cylinder part 114 at the same interval.

The stator 12 has a layered part, i.e., a layered structure of a magnetizable thin metal such as iron, and an insulator disposed on a radial outside of the layered part, and the stator 12 is disposed in an inside of the motor case 11. The number of sheets of the thin metal in the layered part of the stator 12 may be changed according to the output required for the motor 10. Thereby, the output of the motor 10 can be changed by changing the axial length of the stator 12, without changing the radius length of the motor 10.

The first winding group 13 and the second winding group 14 are wound on the insulator of the stator 12. For each of the three phases, a first motor line 135 is taken out from the first winding group 13, and for each of the three phases, a second motor line 145 is taken out from the second winding group 14. The motor lines 135 and 145 are taken out, i.e., extend, from the motor case 11 toward the ECU 40 (see FIG. 7).

The first motor line 135 includes a first U phase motor line 136 and a first V phase motor line 137 and a first W phase motor line 138, and the three lines 136, 137, 138 are positioned away in a numeral ascending order from the power relays 71 and 72.

The second motor line 145 includes a second U phase motor line 146 and a second V phase motor line 147 and a second W phase motor line 148, and the three lines 146, 147, 148 are positioned away in a numeral descending order from the power relays 71 and 72.

The first U phase motor line 136 and the second U phase motor line 146, and the first V phase motor line 137 and the second V phase motor line 147, and the first W phase motor line 138 and the second W phase motor line 148 are respectively arranged at point-symmetric positions around a center axis O of the motor 10 mentioned later. Further, the first U phase motor line 136 and the first W phase motor line 138 are symmetric against the first V phase motor line 137. Similarly, the second U phase motor line 146 and the second W phase motor line 148 are symmetrically positioned against the second V phase motor line 147.

Thereby, the magnetic flux leakage from the first motor line 135 and the magnetic flux leakage from second the motor line 145 cancel with each other. Further, the influence of the magnetic flux leakage on the rotational angle sensor 85 that is mounted at a position on the center axis O of the motor 10 is reduced in such configuration, thereby reducing the detection error of the sensor 85.

Here, "symmetry" means a substantially-symmetric arrangement of those lines, for the cancellation of the magnetic flux leakage, allowing a dimension error in the actual product.

The rotor 15 has a rotor core 151 and a permanent magnet 152. The rotor core 151 is formed in an approximately cylindrical shape, for example, and is made from a magnetic material, e.g. iron, and is coaxially arranged in an inside of the stator 12, i.e., in a radius inside of the stator 12.

The permanent magnet 152 is disposed on a radius outside of the rotor core 151, and the N pole and the S pole of the rotor core 151 alternate with each other.

The shaft 16 is formed in a rod shape, for example, with metal, and is fitted at the center position, i.e., on a rotation axis of the rotor core 151. The shaft 16 is rotatably supported by the bearing 166 fitted on the bottom part 111 of the motor case 11 and by a bearing 167 fitted on the frame member 20. Thereby, the shaft 16 is rotatable with the rotor 15. Further, an outer wall of the rotor 15 and an inner wall of the stator 12 are interposed with an air gap.

The one end 161 of the shaft 16 is inserted into the shaft hole 112 that is bored on the bottom part 111 of the motor case 11, and projects toward an outside of the motor case 11. The one end 161 of the shaft 16 serves as an output end, which is connected to the speed reduction gear 9, for outputting the torque from the motor 10 toward the column shaft 102 via the speed reduction gear 9 (see FIG. 1), even though a connection between the output end and the speed reduction gear 9 is not explicitly illustrated.

The other end 162 of the shaft 16 has a magnet holding member part 17 that holds the magnet 18.

Figure 7:
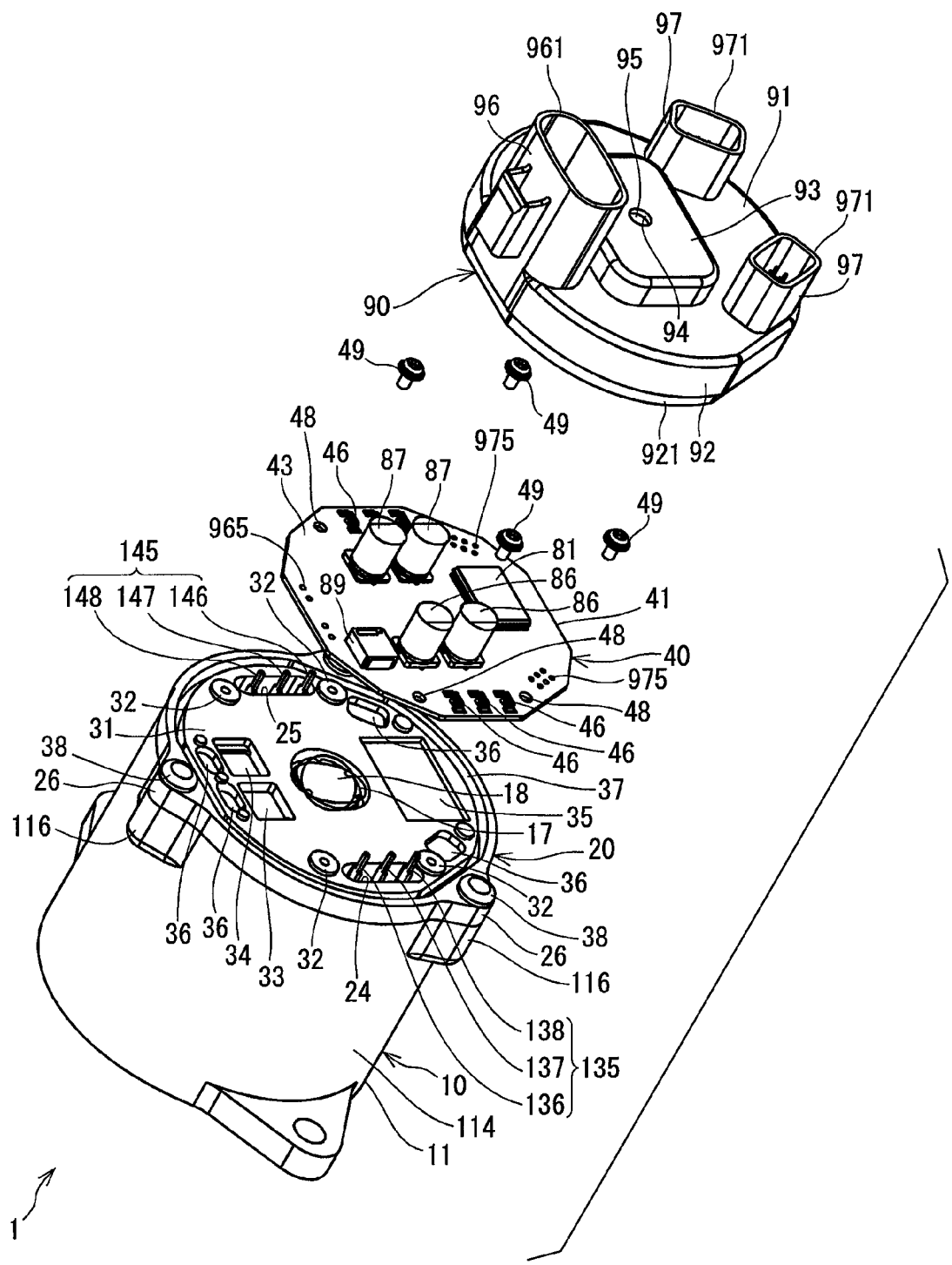
FIG. 7 is an exploded perspective view of the drive unit in the first embodiment of the present disclosure.

As shown in FIG. 3 and FIG. 7, for example, the frame member 20 made from highly-heat-conductive metal, such as aluminum or the like is formed in a lid shape for closing the opening of the motor case 11, i.e., is inserted into an inside of the cylinder part 114. Here, one side of the frame member 20 close to the motor 10 is designated as a motor side face 21, and the other side of the frame member 20 away from the motor 10 and close to the ECU 40 is designated as an ECU side face 31.

A shaft hole 23 is bored substantially at the center of the frame member 20. The other end 162 of the shaft 16 is inserted into the shaft hole 23. Thereby, the magnet 18 disposed on the other end 162 of the shaft 16 is exposed to, i.e., faces, the ECU 40. The bearing 167 is fitted on the frame member 20.

Further, the frame member 20 has a motor line insertion hole 24 into which the motor line 135 is inserted and a motor line insertion hole 25 into which the motor line 145 is inserted. Thereby, the motor lines 135 and 145 are taken out therefrom to extend toward the ECU 40.

The frame member 20 has a fixing tab 26 which projects outward in a radius direction at corresponding positions (i.e., three positions in the present embodiment) corresponding to the fixing tab 116 of the motor case 11. The fixing tab 26 has a through hole 27 bored thereon. A frame lockscrew 38 serving as a "fixture member" is inserted into the through hole 27, and is tightly screwed into the screw-threaded hole 117. Thereby, the frame member 20 is fixed onto the motor case 11.

Here, one side of the fixing tab 116 close to the ECU 40 is a first contact surface 118, and the other side of the fixing tab 26 close to the motor 10 is a second contact surface 268. In the present embodiment, although the anodized aluminum treatment is performed on the surface of the motor case 11, the first contact surface 118 is planed, i.e., abraded, to remove such treatment for the conductivity. In the present embodiment, the first contact surface 118 and the second contact surface 268 are a "conduction part between the case member and the controller holding member", respectively.

In the present embodiment, the first contact surface 118 and the second contact surface 268 are tightly attached with each other by the frame lockscrew 38. Thereby, the motor case 11 and the frame member 20 are electrically connected with each other. Further, by using a conductive frame lockscrew 38, the electrical connection between the motor case 11 and the frame member 20 is established also by the frame lockscrew 38.

At an outer periphery of the frame member 20 and around the motor side face 21 which is close to the bottom part 111 than the fixing tab 26, an O ring groove 29 is provided, into which an O ring 39 is fitted, and the O ring 39 bound by the O ring groove 29 and the cylinder part 114 provides a watertight structure. Thereby, water and the like are prevented from intruding into the motor 10 via a position between the motor case 11 and the frame member 20.

The ECU side face 31 of the frame member 20 has a substrate fixing tab 32, relay rooms 33 and 34, an ASIC room 35, a terminal receptacle groove 36, and an adhesion groove 37.

As shown in FIGS. 3, 7-11, the ECU 40 is disposed away from the motor 10 relative to the frame member 20, i.e., with the frame member 20 interposed therebetween. The ECU 40 is positioned substantially within the motor region, i.e., substantially coaxially disposed with the motor 10.

The ECU 40 has the substrate 41 on which many electronic components are mounted.

The substrate 41 is formed in a shape that fits into the motor region. In the present embodiment, more practically, the substrate 41 is contained within the groove region, i.e., in a radius inside of the adhesion groove 37 provided on the ECU side face 31 of the frame member 20. In other words, the ECU components on the substrate 41, such as the SW elements 51-56, 61-66, the current detection elements 57-59, 67-69, the capacitors 86, 87, and the choke coil 89, are positioned within the motor region.

Here, one side of the substrate 41 close to the motor 10 is designated as a heat generation element mounting surface 42, and the other side, a surface away from the motor 10, is designated as an electronic component mounting surface 43.

Figure 8:
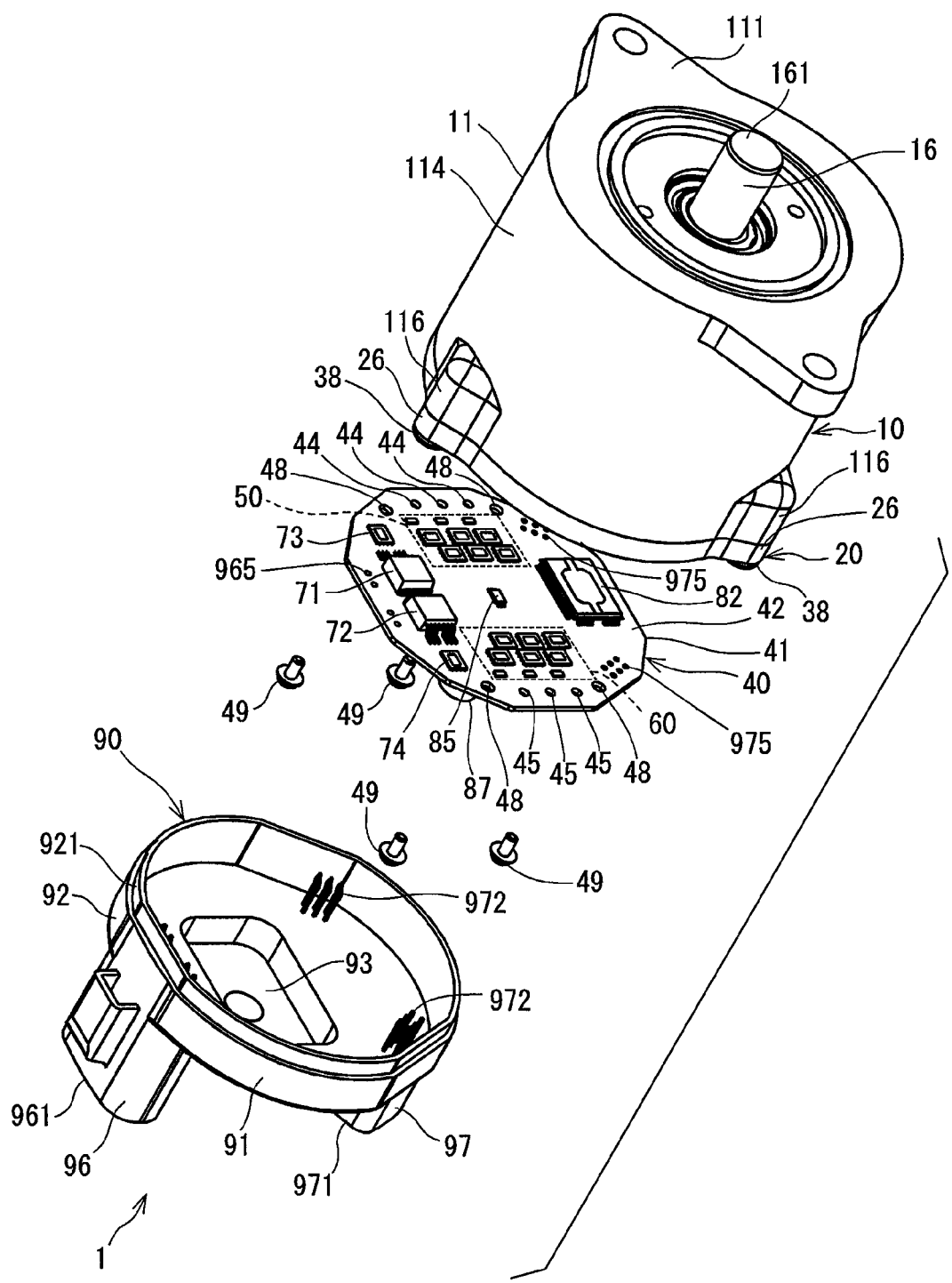
FIG. 8 is another exploded perspective view of the drive unit in the first embodiment of the present disclosure.
Figure 9:
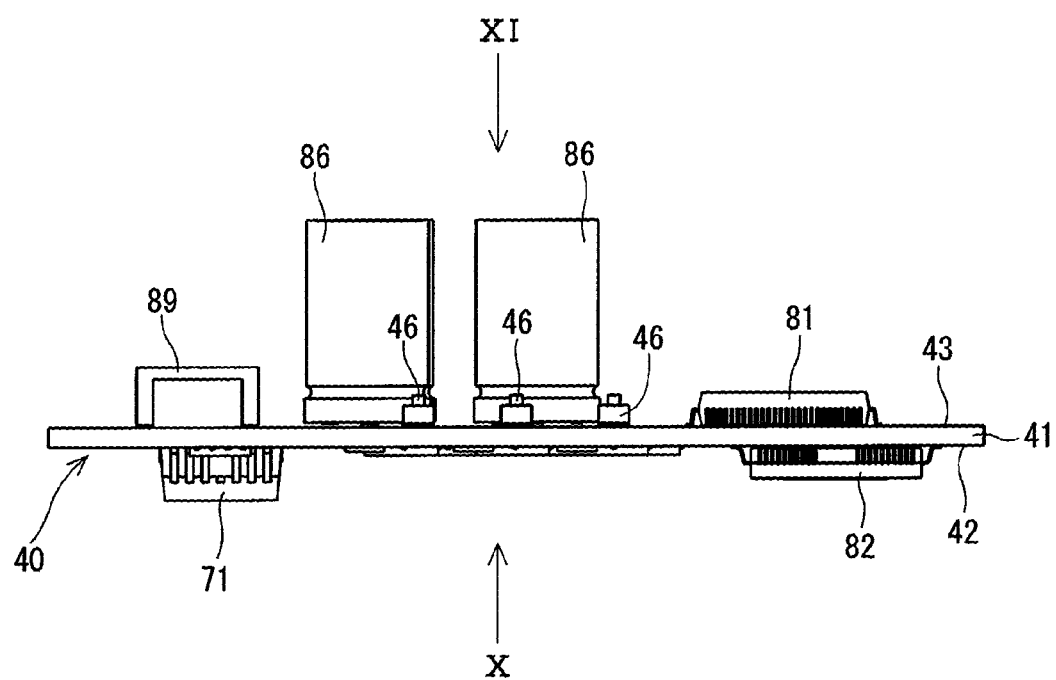
FIG. 9 is a side view of an Engine Control Unit (ECU) in the first embodiment of the present disclosure.
Figure 10:
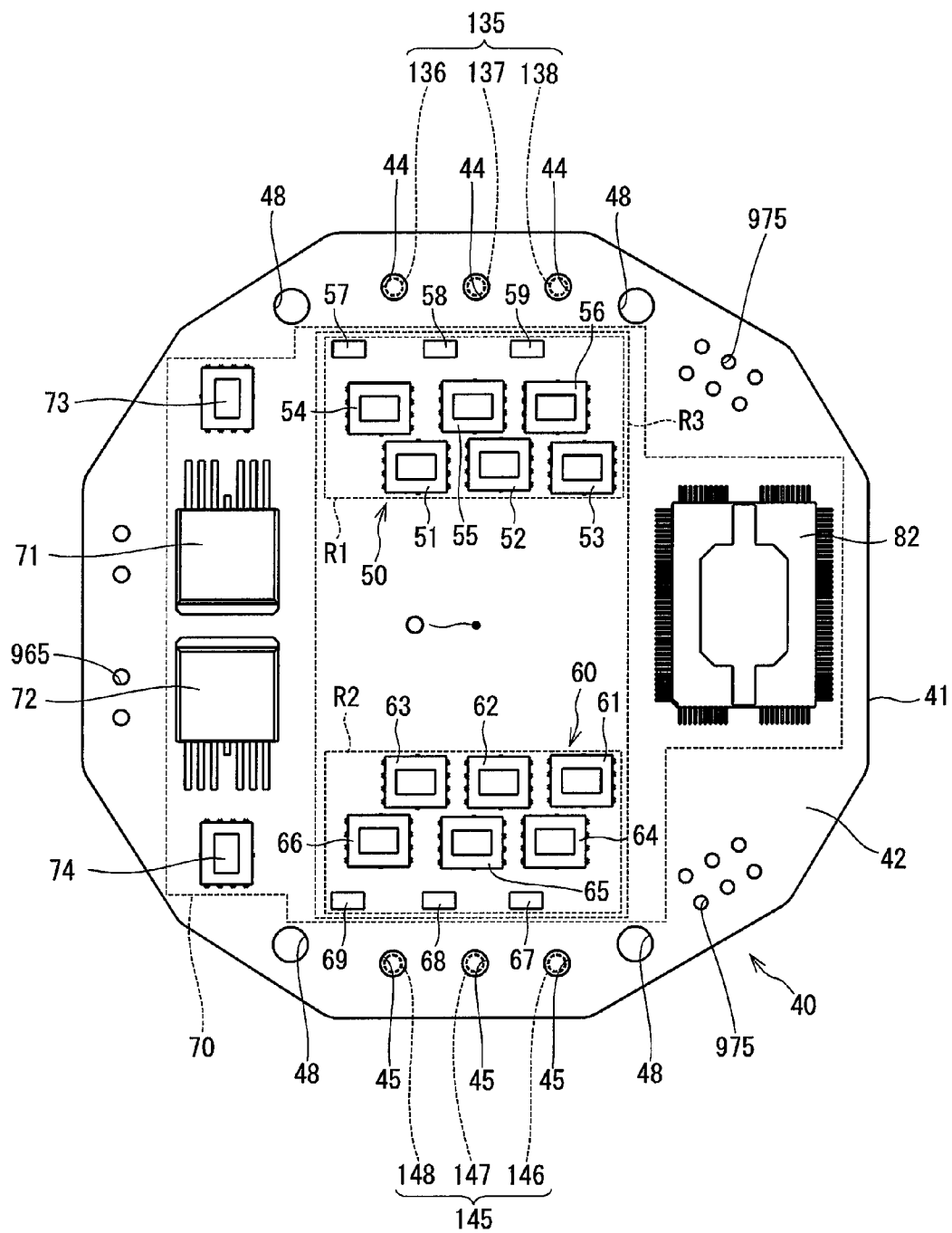
FIG. 10 is a bottom view of the ECU along an arrow X in FIG. 9.
Figure 11:
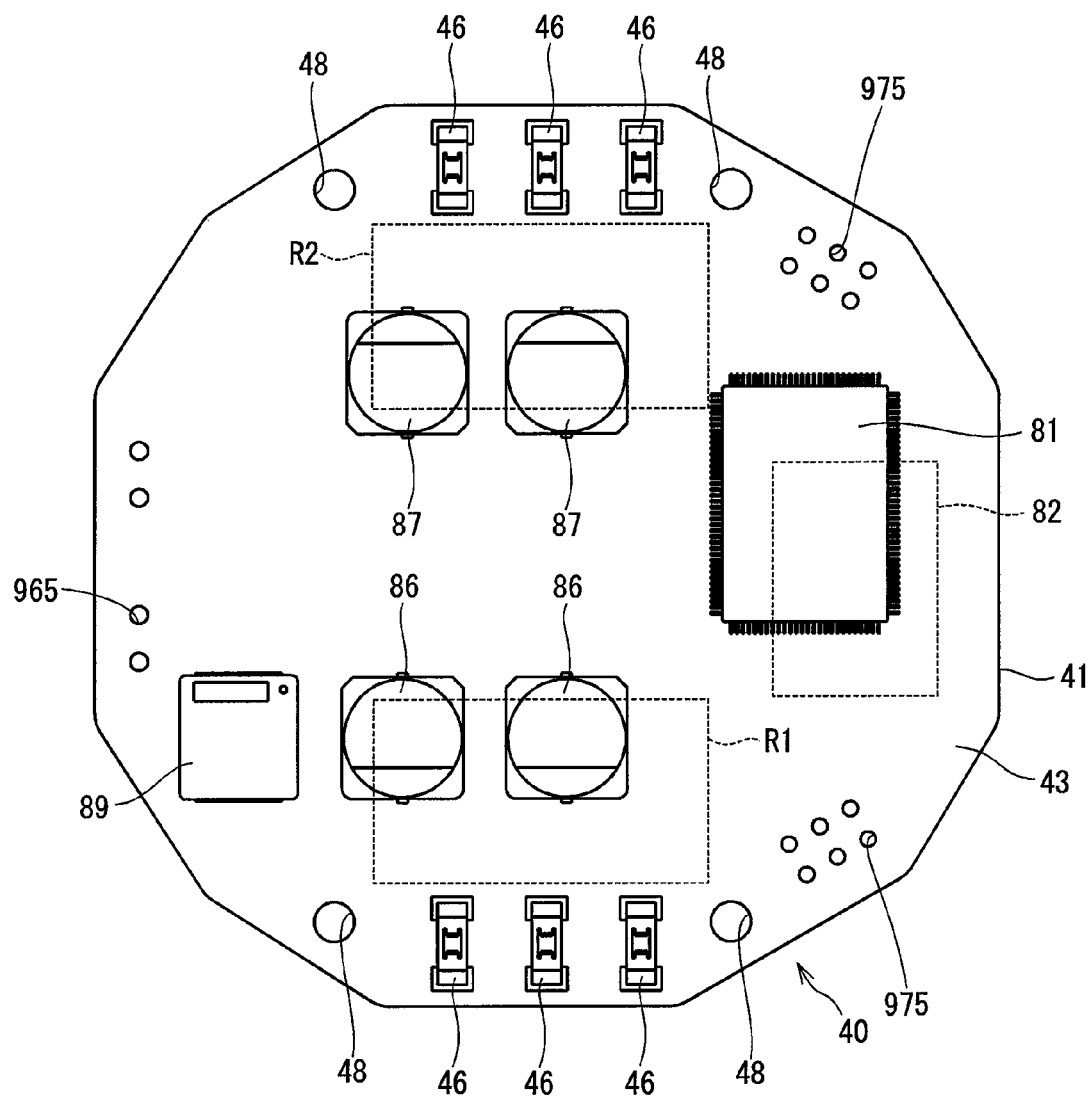
FIG. 11 is a top view of the ECU along an arrow XI in FIG. 9.

As shown in FIG. 8 and FIG. 10, for example, the SW elements 51-56, 61-66 as well as the current detection elements 57-59, 67-69, the power relays 71, 72, the reverse connection protection relays 73, 74, the ASIC 82, and the rotational angle sensor 85 are surface-mounted on the heat generation element mounting surface 42 together with other parts. The rotational angle sensor 85 is omitted from the illustration in FIG. 10. In FIG. 11, a dashed line shows a region where a mold case of the ASIC 82 is disposed.

The rotational angle sensor 85 is mounted substantially at a center position on the heat generation element mounting surface 42, which faces the magnet 18 which is exposed from the frame member 20. Here, when the axis line of the shaft 16 and its extension are considered as the center axis O of the motor 10, the rotational angle sensor 85 is mounted on the center axis O of the heat generation element mounting surface 42 (see FIG. 3).

A first region R1, where the SW elements 51-56 of the first inverter part 50 are mounted, and a second region R2, where the SW elements 61-66 and the current detection elements 67-69 of the second inverter part 60, are symmetrically arranged on the opposite sides of the center axis O of the motor 10. In the present embodiment, the SW elements 51-56 and the SW elements 61-66 are arranged as axially-symmetric on both sides of a straight line passing through the center axis O of the motor 10.

The three phases of U, V, W are arranged in order from the relay 71 side in the first inverter part 50, and the three phases of W, V, U are arranged in order from the relay 72 side in the second inverter part 60, which makes a point-symmetric relation between the two inverters 50, 60 for the three phases. In the present embodiment, the phase arrangement sequence of the second system 202 is in a reverse order to the phase arrangement sequence of the first system 201.

Thereby, while the impedance is reduced, the length of wiring in each of the three phases on the substrate 41 is substantially equated, and the variation of the impedance in each of the three phases is reduced, or equated. The "symmetry" in the above means a substantially-symmetric arrangement of the three phases, allowing a dimension error in the actual product.

Further, the SW elements 54-56 connected to the low potential side are arranged on the outside of the SW elements 51-53 connected to the high potential side, and the current detection elements 57-59 are arranged further on the outside thereof.

Similarly, the SW elements 64-66 connected to the low potential side are arranged on the outside of the SW elements 61-63 connected to the high potential side, and the current detection elements 67-69 are arranged further on the outside thereof.

The SW elements 51-56, 61-66, the current detection elements 57-59, 67-69, the power relays 71, 72, the reverse connection protection relays 73, 74, and the ASIC 82 which are mounted on the heat generation element mounting surface 42 respectively contact the ECU side face 31 of the frame member 20 in a heat transferable manner via a heat dissipation gel which is not illustrated. Thereby, heat generated by the SW elements 51-56, 61-66, the current detection elements 57-59, 67-69, the power relays 71, 72, the reverse connection protection relays 73, 74, and the ASIC 82 is dissipated via the heat dissipation gel to the frame member 20. In FIG. 3 or other drawings, the ASIC 82 and the frame member 20 may look as if they are disposed in a non-contacting state, as a result of the omission of the heat dissipation gel.

That is, the SW element 51-56, 61-66, current detection elements 57-59, 67-69, the power relays 71, 72, the reverse connection protection relays 73, 74, and the ASIC 82 constitutes a heat generation element 70 in the present embodiment.

The power relays 71, 72, which is a large size element in comparison to the SW elements 51-56, 61-66 and the reverse connection protection relays 73, 74, are accommodated in the relay rooms 33, 34 provided on the ECU side face 31 of the frame member 20.

The ASIC 82, which is a large size element in comparison to the SW elements 51-56, 61-66 and the reverse connection protection relays 73, 74, is accommodated in the ASIC room 35 provided on the ECU side face 31 of the frame member 20.

In the present embodiment, the frame member 20, which is disposed on one end of the motor 10 in the axial direction defines an outline of the motor 10, provides a support for the ECU 40, and provides a heat dissipation path for dissipating heat from the heat generation element 70. Thereby, as compared with a case in which a heat sink is provided separately, the number of components is reduced, and the volume of the drive unit is reduced.

As shown in FIG. 7 and FIG. 11, for example, the microcomputer 81, the capacitors 86, 87, and the choke coil 89 are mounted on the electronic component mounting surface 43, together with other parts. In the present embodiment, the microcomputer 81, the capacitors 86, 87, and the choke coil 89 are equivalent to "electronic components" in the claims.

The microcomputer 81 is mounted at a position on a reverse side of the substrate 41, i.e., partially overlapping with the ASIC 82 as seen in FIG. 11.

The capacitor 86 is mounted on a reverse side of the substrate 41, i.e., partially overlapping with the first region R1, where the SW elements 51-56 of the first inverter part 50 are mounted. The capacitor 87 is mounted on a reverse side of the substrate 41, i.e., partially overlapping with the second region R2, where the SW elements 61-66 of the second inverter part 60 are mounted. The noise reduction effect increases by arranging the capacitors 86, 87 on the reverse side of the inverter parts 50, 60.

In the present embodiment, by mounting relatively large-size electronic components, e.g., the capacitors 86, 87 and the choke coil 89, on the electronic component mounting surface 43, the substrate 41 is positioned at a proximity of the frame member 20. Thereby, heat generated by the heat generation element 70 on the heat generation element mounting surface 42 is dissipated to the frame member 20 from the "back" of those components.

A radius outside position of the first region R1 has a motor line insertion hole 44 bored therethrough. The motor line 135 is inserted into the motor line insertion hole 44. A radius outside position of the second region R2 has a motor line insertion hole 45 bored therethrough. The motor line 145 is inserted into the motor line insertion hole 45.

On the electronic component mounting surface 43, a motor line connector 46 made from a conductive metal or the like is provided at a position where the motor line insertion holes 44 and 45 are bored. The motor line connector 46 has a press-fit part, and the press-fit part receiving the motor lines 135 and 145 establishes an electrical connection between the substrate 41 and the motor lines 135, 145.

A hole 48 is bored at a position corresponding to the substrate fixing tab 32 of the substrate 41. A substrate lockscrew 49 (see FIGS. 7 and 8) is made from a conductive material which conducts an electric current, is inserted into the hole 48, and is tightly screwed onto the substrate fixing tab 32 of the frame member 20. The substrate 41 is tightly fixed onto the frame member 20 by the axial force of the substrate lockscrew 49, and, an electrical connection therebetween is established at the same time. Just like the frame lockscrew 38, when the lockscrew 49 is made from the conductive material, the electrical connection via the substrate lockscrew 49 is also established.

The hole 48 is bored in a region of the substrate 41 where a ground pattern is formed. The ground pattern on the substrate 41 is electrically connected to the power supply ground line 500 via the power supply connector 96.

As mentioned above, the motor case 11 and the frame member 20 are electrically connected via the frame lockscrew 38. Therefore, the motor case 11 and the frame member 20 are electrically connected to the power supply ground line 500 via the substrate lockscrew 49, the substrate 41, and the power supply connector 96.

As shown in FIGS. 3-5, 7, and 8, a cover member 90 has a cover body 91, the power supply connector 96, and a signal connector 97, and covers the electronic component mounting surface 43 side of the substrate 41.

An insert portion 921 is provided at one end of a peripheral wall 92 of the cover body 91. The insert portion 921 is inserted into the adhesion groove 37 of the frame member 20, and is fixed by the adhesive. Thereby, water or the like is prevented from intruding into the motor 10 from a connection portion between the frame member 20 and the cover member 90.

A capacitor room 93 is formed substantially at the center of the cover body 91. The capacitor room 93 protrudes from the cover body 91, i.e., away from the motor 10, for accommodating the capacitors 86, 87. A breathing hole 94 is bored on the capacitor room 93. The breathing hole 94 has a filter member 95 attached thereon. The filter member 95 is made from a material that passes air but does not pass the water. By having the filter member 95 in the breathing hole 94, the inner pressure of the drive unit 1 stays constant at a certain value even when the temperature changes.

The power supply connector 96 and the signal connector 97 (i.e., "connectors 96 and 97" hereinafter) respectively protrudes away from the cover body 91, i.e., away from the motor 10. In the present embodiment, the connectors 96 and 97 are integrally formed with the cover body 91 in one body.

The power supply connector 96 has an opening 961 disposed on one end which extends away from the motor 10, for a connection to a harness (not illustrated) that extends from the battery 109. Further, the power supply connector 96 has a power supply connector terminal 962 connected to the substrate 41. The power supply connector terminal 962 is inserted into a terminal insertion hole 965 bored on the substrate 41, and is connected to the substrate 41 by solder or the like. Thereby, the ECU 40 is connected to the battery 109.

The signal connector 97 has an opening 971 disposed on one end which extends away from the motor 10, for a connection to a harness (not illustrated). In the present embodiment, two signal connectors 97 are provided, among which one is connected to a harness extending from the torque sensor 103 and the other is connected to a harness extending from CAN. Further, the signal connector 97 has a signal connector terminal 972 connected to the substrate 41. The signal connector terminal 972 is inserted into a terminal insertion hole 975 disposed on the substrate 41, and is connected to the substrate 41 by solder or the like. Thereby, information from the torque sensor 103 and information from CAN are input into the ECU 40.

The tip of each of the power supply connector terminal 962 and the signal connector terminal 972 (i.e., "terminals 962 and 972" hereinafter) is inserted into the terminal receptacle groove 36 that is formed on the ECU side face 31 of the frame member 20, so that the terminals 962, 972 and the frame member 20 are not short-circuited with each other.

The connectors 96 and 97 extend away from the motor 10 on the cover body 91 with their height higher than the capacitor rooms 93 (i.e., the capacitor room 93 substantially "buried" in the connector height). Further, in the axial view of the motor 10, the connectors 96 and 97 are positioned within the motor region, at radius outside positions, i.e., farther away from the center axis O of the motor 10 than the capacitors 86, 87. In other words, a connector disposition region and a capacitor disposition region are not overlapping in the axial view of the motor 10.

Therefore, in comparison to a conventional configuration in which the connector disposition region and the capacitor disposition region are overlapping, the size along the axis (i.e., the height) of the drive unit 1 in the present disclosure is smaller, while preventing the increase of the diameter/radius of the unit 1.

Figure 12:
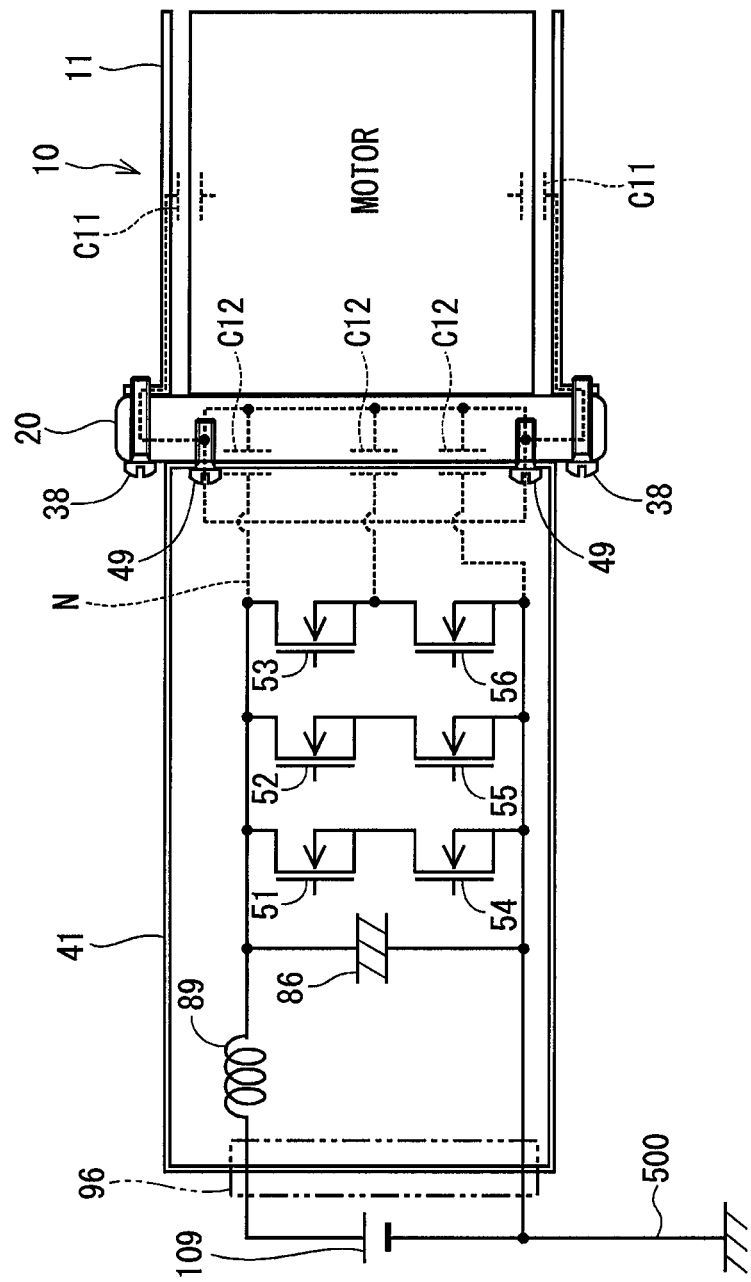
FIG. 12 is a diagram of a noise propagation path in the drive unit of the first embodiment in the present disclosure.

Here, a noise propagation path in the drive unit 1 is described based on FIG. 12.

FIG. 12 is a combined illustration, i.e., a combination of a schematic diagram and a sectional view regarding the drive unit 1, from which the second inverter part 60, the current detection elements 57-59, the power relays 71, 72 and the reverse connection protection relay 73, 74 are omitted. Further, in FIG. 12, the electronic components in an inside of a rectangle representing the substrate 41 are mounted on the substrate 41. Based on such assumption, the dashed line shows a noise propagation path that is constituted by the stray capacitances C11, C12, the motor case 11, the frame member 20, the frame lockscrew 38, and the substrate lockscrew 49.

As shown in FIG. 12, for the ease of understanding, the rotor 15 and the shaft 16 are grouped as a "motor section," and the motor case 11 and the stator 12 are grouped as a "case." The air gap between the motor section and the case bears the stray capacitance C12.

When the stray capacitances C11 and C12 are caused in the air gap, the noise produced by the drive of the motor section, the switching of the SW elements 51-56, 61-66, etc. propagates to the motor case 11 via the stray capacitance C11 and C12. Once propagated to the motor case 11, the noise turns to a common mode noise, and may further be propagated to the battery 109 via the vehicle-body ground etc. Further, when the noise propagates to an outside of the drive unit 1 (e.g., vehicle body etc.) via the motor case 11, the noise may further be propagated to the antenna of the in-vehicle radio which is not illustrated, and may cause the radio noise.

Therefore, in the present embodiment, the motor case 11 and the frame member 20 are respectively connected to the power supply ground line 500 electrically, for electrically connecting the stray capacitances C11 and C12 to the power supply ground line 500.

In such manner, the noise caused by the stray capacitances C11 and C12 is considered as the normal mode noise.

Therefore, a filter circuit formed by the choke coil 89, which is a normal mode coil, and the capacitors 87, 88 is applicable to reduce the stray capacitance induced noise, which is caused by C11, C12. Further, a configuration for reducing the common mode noise, etc. is omissible. Furthermore, due to the reduction of the common mode noise and the reduction of the noise leakage to an outside of the drive unit 1 via the motor case 11 and the frame member 20, the radio noise is also reduced.

Specifically in the present embodiment, the anodized aluminum treatment entirely covers the motor case 11, except for "the conduction part between the case member and the controller holding member (i.e., the frame member 20)," for insulation. Therefore, in comparison to a path from the motor case 11 to vehicle-body ground, a path from the motor case 11 to the power supply ground line 500 via the frame member 20, the substrate 41, and the power supply connector 96 has a smaller impedance. Thus, the common mode noise leaking to an outside of the drive unit 1 via the motor case 11 and the frame member 20 is further reduced.

Further, for the minimization of the impedance of the path from the motor case 11 to the power supply ground line 500, it may be preferable to position the frame lockscrew 38 and the substrate lockscrew 49 for the noise propagation path to have a shortest distance.

As described in details above, the drive unit 1 is provided with the motor 10, the frame member 20, the ECU 40, and the power supply connector 96. The motor 10 has the stator 12, the rotor 15, and the shaft 16. The stator 12 has the first winding group 13 and the second winding group 14 wound thereon. The rotor 15 is rotatably disposed in an inside of the stator 12. The shaft 16 rotates together with the rotor 15. The frame member 20 is disposed in one end of the motor 10.

The ECU 40 has the substrate 41, the heat generation element 70, and the electronic components.

The substrate 41 is fixed to the frame member 20. The heat generation element 70 is mounted on the heat generation element mounting surface 42 which is on one side of the substrate 41 facing the frame member 20, and is configured to be able to dissipate heat to the frame member 20. The electronic components including the microcomputer 81, the capacitors 86, 87, and the choke coil 89 are mounted on the electronic component mounting surface 43 which is another side of the substrate 41, facing away from the frame member 20.

The power supply connector 96 connects the substrate 41 and the battery 109. Further, the power supply ground line 500 which is connected to the ground terminal of the battery 109 and the frame member 20 are conductively connected via the substrate 41 and the power supply connector 96.

In the present embodiment, the frame member 20 is connected to the power supply ground line 500 via the substrate 41 and the power supply connector 96. Thus, the noise caused in the path provided by the stray capacitance C12 between the frame member 20 and the substrate 41 is collected by the power supply ground line 500 via the power supply connector 96, the noise caused by the stray capacitance C12 is considered as the normal mode noise. In other words, the noise, which may otherwise be inducing the common mode noise, is collected as the normal mode noise to the battery 109 in the present embodiment.

Therefore, based on the reduction of the common mode noise, the common mode noise reduction scheme/configuration is simplified or is omitted. Further, the radio noise otherwise propagated from the drive unit 1 to the in-vehicle radio via the frame member 20 is reduced.

The electronic components mounted on the electronic component mounting surface 43 include the capacitors 86, 87 and the choke coil 89 that form a filter circuit. The choke coil 89 is a normal mode coil for reducing the normal mode noise. Therefore, the normal mode noise in the drive unit 1 is appropriately reduced.

The motor 10 is further provided with a case member having the cylinder part 114 that is disposed at a radius outside of the stator 12 i.e., a radius farther away than a radius from the center axis O of the motor 10 to the stator (12).

The cylinder part 114 and the power supply ground line 500 are connected via the frame member 20, the substrate 41, and the power supply connector 96, for electric conductivity therebetween.

By such connection, the stray capacitance C11 caused in the air gap between the motor section and the case is electrically connected to the power supply ground line 500, the noise resulting from the stray capacitance C11 is considered as the normal mode noise. In other words, the noise by the stray capacitance C11 which may otherwise be considered as the common mode noise is collected by the battery 109 as the normal mode noise. Thereby, the common mode noise is further reduced.

In the present embodiment, the motor case 11 and the frame member 20 have separate bodies. The first contact surface 118 which is a surface in the motor case 11 for contacting the frame member 20, and the second contact surface 268 which is a surface in the frame member 20 contacting the motor case 11 are conductively contacting with each other by a surface contact.

Providing the motor case 11 and the frame member 20 as separate bodies makes it easy for the frame member 20 to have a heat dissipation process/treatment, for the ease of heat dissipation from the heat generation element 70. Further, by providing the surface contact for a connection between the motor case 11 and the frame member 20, the electrical connection therebetween is enabled to the "thick," thereby securely collecting the noise caused by C11, C12 as the normal mode noise, which may otherwise be considered as the common mode noise, and thereby further reducing the noise leakage to an outside of the drive unit 1. Further, the motor case 11 which provides casing of the drive unit 1 and the frame member 20 are configured to be conductive with each other, the noise caused by C11 and C12 is collected by the battery 109, thereby reducing the wiring for connecting the stray capacitance C11 and C12 to the battery 109. That is, the number of components in the drive unit 1 is reduced.

The motor case 11 and the frame member 20 are fixedly attached by the frame lockscrew 38 in an electrically conductive manner. By fixing the motor case 11 and the frame member 20 with the frame lockscrew 38, a conduction between the motor case 11 and the frame member 20 is securely established with the axial force exerted by the frame lockscrew 38. Further, the frame lockscrew 38 made from a conductive material further facilitates the electrical connection therethrough, i.e., making the noise collection path to the battery 109 for collecting the noise from the stray capacitances C11 and C12 thicker, which further reduces the noise leaking from the drive unit 1.

Further, plural frame lockscrews 38 are provided at the same interval, thereby evenly reducing the impedance between the motor case 11 and the frame member 20.

In the motor case 11, the insulation process/treatment is performed for a portion other than the conduction part between the case 11 and the frame member 20. In such configuration, the path that propagates the common mode noise has a large impedance, thereby reducing the noise, i.e., the common mode noise leaking from the drive unit 1.

The electronic components such as the heat generation element, the microcomputer and the like are arranged in the projection area, which is a silhouette of the cylinder part 114 of the motor 10, i.e., the motor case 11, along the axial direction. Thereby, the volume of the drive unit 1 in the radial direction is appropriately reduced.

The drive unit 1 of the present embodiment is applied to the electric power steering device 8. In other words, the electric power steering device 8 is provided with the drive unit 1 and the speed reduction gear 9 which transmits the torque outputted from the motor 10 to the column shaft 102, drives the column shaft 102 by the torque of the motor 10, and assists a steering operation of the steering wheel 101 by the driver.

The drive unit 1 of the present embodiment has the motor 10 and the ECU 40 coaxially disposed for the volume/size reduction along the axis of the drive unit 1, and is configured to have a slim shape, i.e., has the entire device substantially contained in the motor region, which is a projection silhouette of the cylinder part 114 along the axial direction. Thereby, the drive unit 1 is workable, e.g., easy to install in a small space under the hood. Further, the leakage of the noise from the drive unit 1 is reduced, thereby reducing the radio noise that affects an in-vehicle radio unit.

Further, the drive unit 1 in the present embodiment has the O ring 39 provided at a position between the motor case 11 and the frame member 20 and also has the frame member 20 and the cover member 90 combined by using adhesive, thereby realizing a waterproof structure. Therefore, the drive unit 1 may be disposed in an engine room, for example, and is suitably used in a rack-assist type electric power steering.

Second Embodiment

Figure 13:
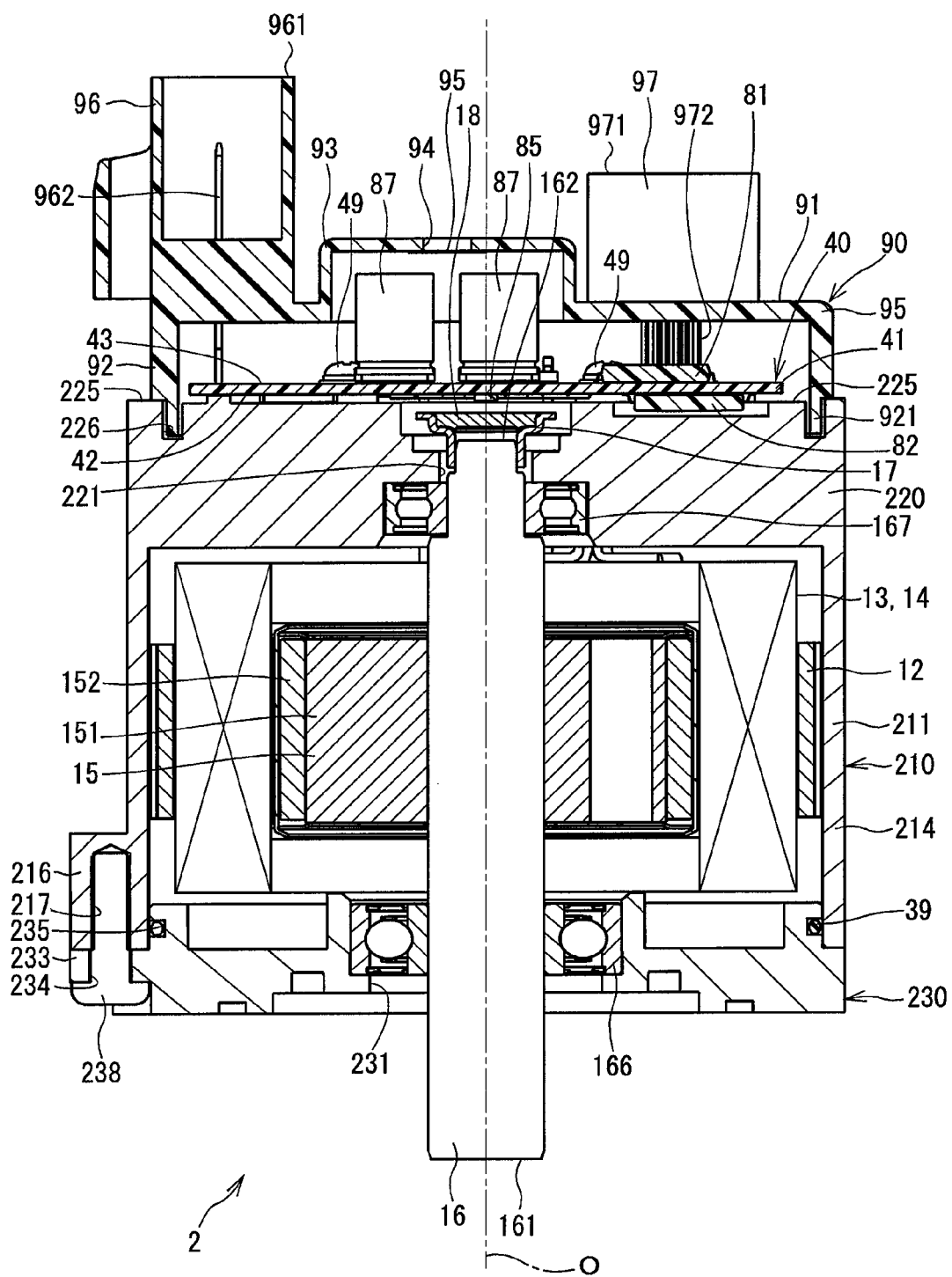
FIG. 13 is a sectional view of the drive unit in a second embodiment of the present disclosure.
Figure 14:
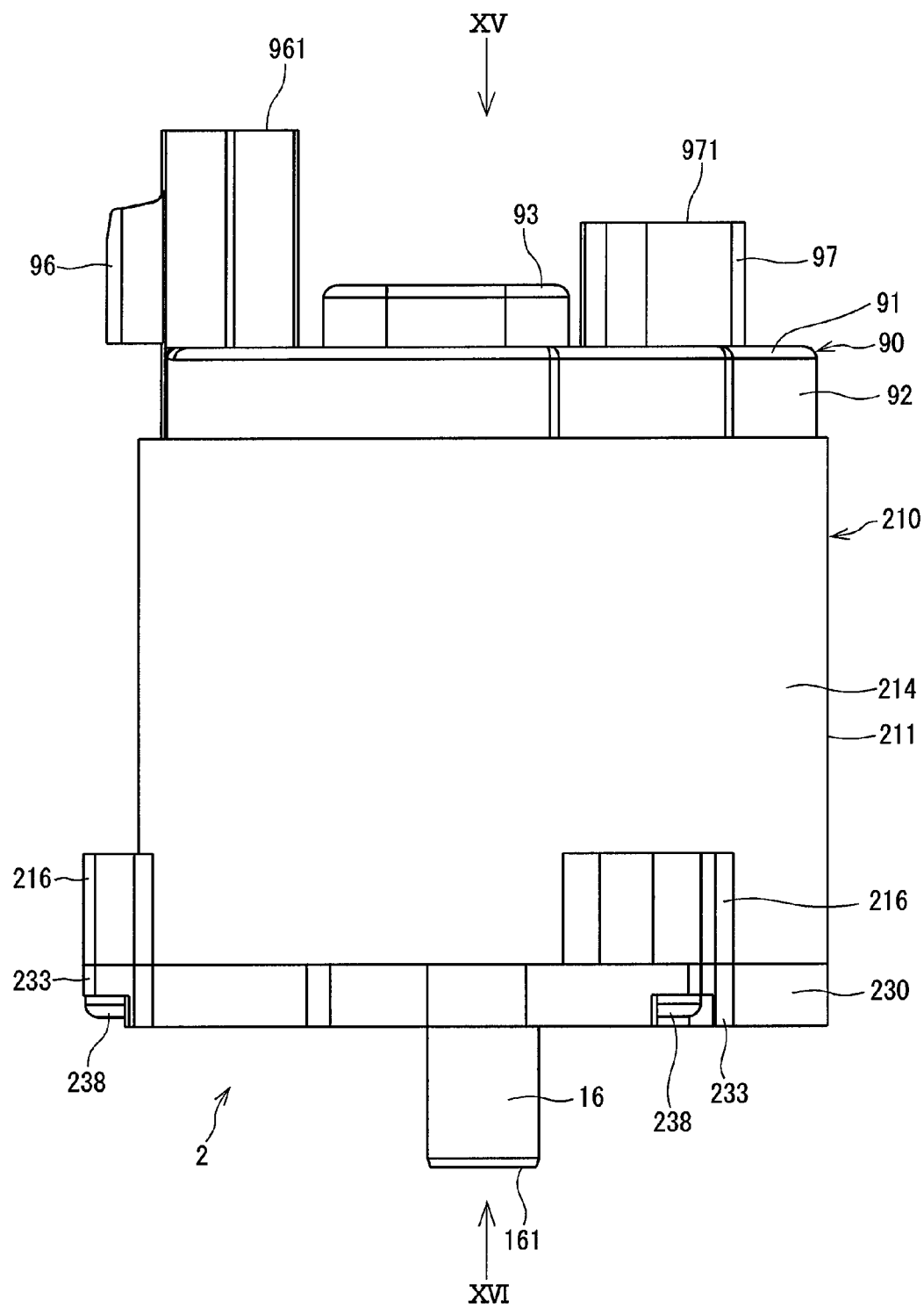
FIG. 14 is a side view of the drive unit in the second embodiment of the present disclosure.
Figure 15:
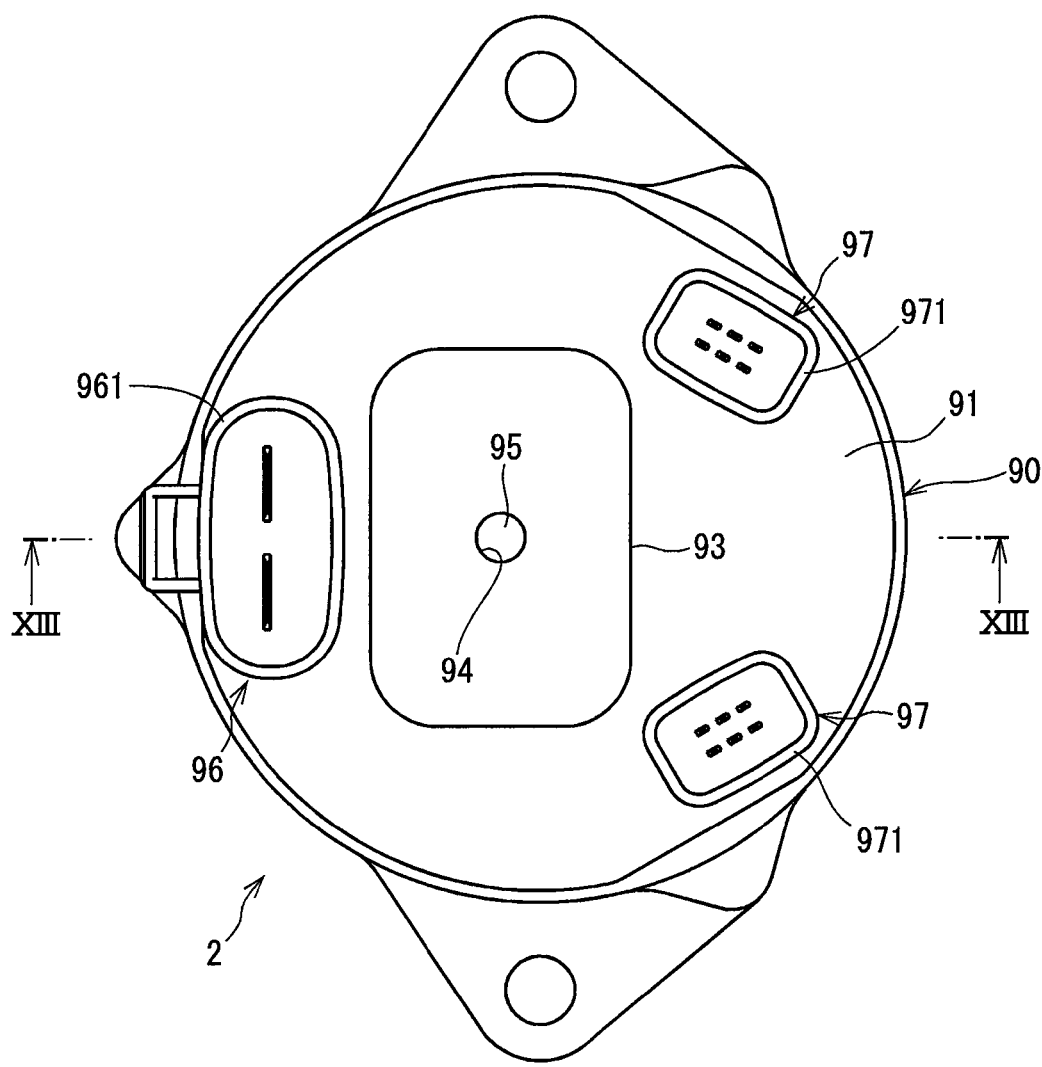
FIG. 15 is a top view of the drive unit along an arrow XV in FIG. 14.
Figure 16:
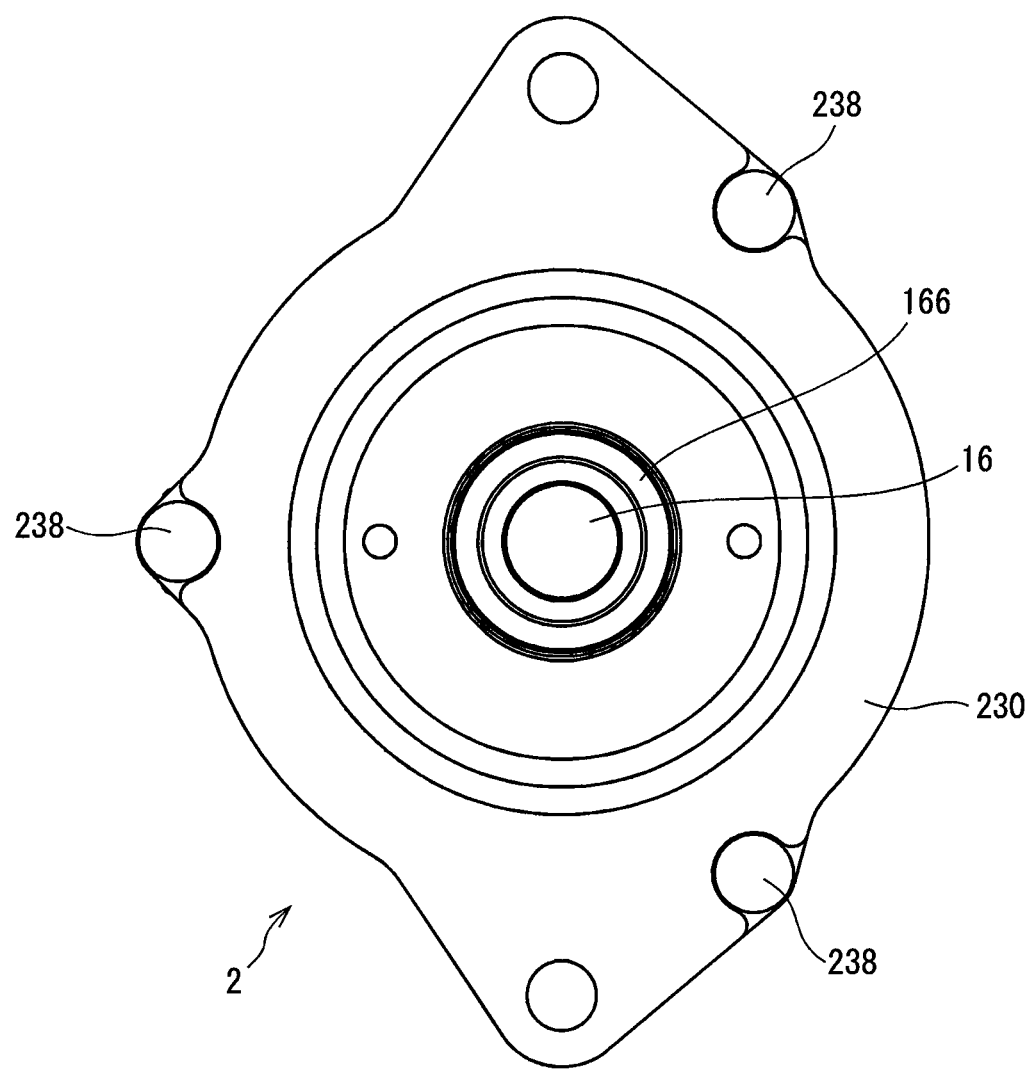
FIG. 16 is a bottom view of the drive unit along an arrow XVI in FIG. 14.

The drive unit in the second embodiment of the present disclosure is shown in FIGS. 13-16. FIG. 13 is a sectional view of a XIII-XIII line in FIG. 15.

As for a drive unit 2 of the present embodiment, a motor 210 as a rotating electric machine and the ECU 40 as a controller are disposed in one body. The motor 210 has a motor case 211 and a frame member 230 which are different from the ones in the above-mentioned embodiment.

The motor case 211 has a bottom part 220 and a cylinder part 214, for example, and has a bottom-closed cylinder shape made from metal, e.g. the aluminum, for heat conductivity. In the present embodiment, the bottom part 220 faces the ECU 40, and the other end, or an opposite side, is an opening of the cylinder part 214.

A fixing tab 216 for fixing the frame member 230 is disposed around the opening of the cylinder part 214, i.e., projecting outward along the radius direction. Further, a screw-threaded hole 217 is bored in the fixing tab 216. The fixing tab 216 is disposed at three positions at equal intervals.

A shaft hole 221 into which the other end 162 of the shaft 16 is inserted is disposed substantially at the center of the bottom part 220. The other end 162 of the shaft 16 is inserted into the shaft hole 221. Thereby, the magnet 18 provided in the other end 162 of the shaft 16 is exposed to face the ECU 40. Further, the bearing 167 is fitted on the bottom part 220.

Further, a motor line insertion hole into which the motor lines 135 and 145 are inserted (not illustrated) is bored on the bottom part 220. Thereby, the motor lines 135 and 145 are taken out to extend toward the ECU 40.

A substrate fixing tab which is not illustrated is formed on a bottom surface 225 of the bottom part 220, and the substrate 41 is fixed onto the surface 225 by the substrate lockscrew 49. The ground pattern on the substrate 41 and the motor case 211 are tightly connected by the axial force of the substrate lockscrew 49, thereby electrically connected with each other.

Thereby, the motor case 211 is electrically connected to the power supply ground line 500 via the substrate lockscrew 49, the substrate 41, and the power supply connector 96.

Further, the heat generation element 70 mounted on the heat generation element mounting surface 42 of the substrate 41 is enabled to dissipate heat from a back side toward the bottom surface 225 of the bottom part 220 via the heat dissipation gel.

An adhesion groove 226 is provided on the radius outside, i.e., a periphery, of the bottom surface 225, which is an outside of the substrate 41. The cover member 90 is fixed onto the motor case 211 by the insert portion 921 of the cover member 90 being inserted into the adhesion groove 226 and fixed with the adhesive. The cover member 90 is formed in one body with the connectors 96 and 97, just like the above-mentioned embodiment.

Further, on the bottom surface, a receptacle groove (not illustrated) is provided, and the groove receives a tip of the power supply connector terminal 962 and a tip of the signal connector terminal 972 inserted thereinto, for preventing the short-circuit between the terminals 962 and 972 and the motor case 211.

A frame member 230 is made from metal, e.g. the aluminum, for example, and is inserted into the cylinder part 214 for closing the opening of the motor case 211.

A shaft hole 231 is bored substantially at the center of the frame member 230, into which the one end 161 of the shaft 16 is inserted. Further, the bearing 166 is fitted on the frame member 230.

The frame member 230 has a fixing tab 233 which projects outward in the radius direction at corresponding positions (i.e., three positions in the present embodiment) corresponding to the fixing tab 216. The fixing tab 233 has a through hole 234 bored thereon. A frame lockscrew 238 is inserted into the through hole 234, and is screwed onto the screw-thread hole 217. Thereby, the frame member 230 is fixed onto the motor case 211.

At an outer periphery of the frame member 230 which is close to the bottom part 220 than the fixing tab 233, an O ring groove 235 is provided, into which an O ring 39 is disposed, and the O ring 39 is bound by the frame member 230 and the cylinder part 214. Such a structure prevents water and the like from intruding into an inside of the motor 210.

In the present embodiment, the bottom part 220 of the motor case 211 is disposed to face the ECU 40, and the substrate 41 is fixed onto the bottom part 220 so that the heat generation element 70 can dissipate heat from the back. In other words, according to the present embodiment, the bottom part 220 corresponds to the "controller holding member", and provides the following functions, i.e., an outline defining function for defining an outline of the motor 210, a holding function for holding the ECU 40, and a heat sink function for dissipating heat, i.e. serving as a heat sink, from the heat generation element 70. Thereby, compared with a case in which a heat sink is provided separately, the number of components is reduced and the volume of the drive unit 2 is reduced.

Further, when heat of the heat generation element 70 is dissipated to the bottom part 220 that is made in one body with the cylinder part 214, dissipated heat is more easily conducted from the bottom part 220 to the cylinder part 214 in comparison to heat dissipation to the frame member 20 that is provided as a separate component from the motor case 11 which causes a resistance in heat conductivity, i.e., heat dissipation area size is larger in the present embodiment, thereby highly efficiently dissipating heat.

The motor case 211 is connected to the power supply ground line 500 via the substrate lockscrew 49, the substrate 41, and the power supply connector 96. Therefore, the stray capacitance C21 between the motor section and the cylinder part 214 of the motor case 211 and the stray capacitance C22 between the bottom part 220 of the motor case 211 and the substrate 41 are connected to the power supply ground line 500 via the substrate 41. In such manner, the noises caused by the stray capacitance C21 and by the stray capacitance C22 are considered as the normal mode noise, thereby achieving the same effect as the earlier-mentioned embodiment.

The stray capacitances C21 and C22 correspond to the stray capacitance C11 and C12 in FIG. 12, and are omitted from the drawing.

In the present embodiment, the cylinder part 214 of the motor case 211 and the bottom part 220 connected to the substrate 41 are formed in one body. Therefore, in comparison to the case in which the cylinder part 214 and the bottom part 220 are separately provided, the impedance of the path from the cylinder part 214 to the power supply ground line 500 is reduced, thereby reducing the noise leaking to an outside of the drive unit 2.

Further, by providing the anodized aluminum treatment for the frame member 230, in comparison to a path from the motor case 211 to the vehicle-body ground, a path from the motor case 211 to the power supply ground line 500 via the substrate 41 and the power supply connector 96 has a smaller impedance. Thus, the common mode noise leaking to an outside of the drive unit 2 is further reduced.

In the present embodiment, the bottom part 220 which serves as the controller holding member is formed in one body with the cylinder part 214.

Thereby, the impedance between the cylinder part 214 and the bottom part 220 is reduced, and the noise which leaks to an outside of drive unit 2 is reduced. Further, the resistance of heat conductivity between the bottom part 220 and the cylinder part 214 is reduced, and a heat dissipation area size is increased in terms of heat dissipation from the heat generation element 70, thereby more efficiently dissipating heat from the heat generation element 70. In addition, the same effects as the above-mentioned embodiment may also be achieved.

Other Embodiments

Although the present disclosure has been described in connection with preferred embodiment thereof with reference to the accompanying FIG.s, it is to be noted that various changes and modifications will become apparent to those skilled in the art.

(a) Controller Holding Member

According to the above-mentioned first embodiment, the frame member is fixed to the motor case by the frame lockscrew.

According to the other embodiments, as long as the frame member and the motor case are conductively connected, the connection may be established not only by the screw, but by the other member.

Further, the number of the fixing tabs may be not only three but more than three, or less than three, and may be not necessarily symmetrically arranged.

Further, in the other embodiments, the frame member may be fixed to motor case by press-fitting. In such case, the inner peripheral wall of the motor case and the outer peripheral wall of the frame member may be fitted, and the conductance between the motor case and the frame member may be established as a surface contact therebetween. In such case, the inner periphery surface of the motor case is equivalent to the "first contact surface", and the outer peripheral surface of the frame member is equivalent to the "second contact surface." Press-fitting of the frame member contributes to the reduction of the number of components, and to the product size reduction along the diameter thereof.

Further, when the bottom of the motor case constitutes the "controller holding member" as described in the second embodiment, there is no need to provide conductivity between the motor case and the frame member. Rather, the combination and fixation between the motor case and the frame member may be established in any manner.

Further, the drive unit in the above-mentioned embodiment is provided with the motor case which has a cylinder part.

However, in the other embodiments, the motor case may be omitted. More practically, a front frame end provided on one side of the motor and a rear frame end provided on the other side of the motor for holding the stator may be attached to each other by a through bolt. In such case, the rear frame end corresponds to the "controller holding member", and the stator corresponds to "the cylinder part of the rotating electric machine." When the motor case is omitted, the stator may be considered as a "cylinder part of the rotating electric machine" and an along-the-axis projection of the stator may be considered as a "motor region". In other words, the cylinder part of the rotating electric machine may be the cylinder part of the motor case, or may be the stator.

(b) Fixation of the Substrate

According to the above-mentioned embodiment, the substrate is fixed to the bottom of the frame member or to the motor case by the substrate lockscrew.

According to the other embodiments, as long as the fixing member is capable of fixing the ground pattern of the substrate to the frame member or to the motor case in a conductive manner, the fixing member may be not necessarily the screw, but any member.

(c) ECU

According to the above-mentioned embodiment, the ECU has the two pairs of the inverter and the relay.

According to the other embodiments, the inverter and the power relay may be provided by three sets or more. Further, the power relay and the reverse connection protection relay constituted by the semiconductor device in the above-mentioned embodiment may be replaced with the mechanical power relay. In such case, the reverse connection protection relay is omissible. Further, when the power relay is provided as the mechanical relay, such relay may preferably be mounted on the electronic component mounting surface of the substrate.

According to the other embodiments, the arrangement of the electronic components on the substrate may be realized in any form, other than the one in the above-mentioned embodiment.

According to the above-mentioned embodiment, the metal piece is mounted on the substrate for a connection with the motor line, and the substrate and the motor line are connected to by press-fitting.

According to the other embodiments, soldering or any other method may be used for the connection between the substrate and the motor line, other than the press-fitting.

(d) Connector Part

In the above-mentioned embodiment, the connector part has one power supply connector and two signal connectors.

According to the other embodiments, one or both of the power supply connector and the signal connector may be provided in plural number. Those connectors may be provided in separate bodies, or may be provided in one body combination.

The connector may be structured to have its opening aligned with the axis of the drive unit, or may be structured to have its opening alighted with the radius direction. Further, the connector disposed on the away side of the substrate relative to the motor in the above embodiment, may also be the motor side of the substrate in the other embodiment.

Further, the connector formed in one body with the cover member in the above-mentioned embodiment, may also be formed separately from the cover member.

(e) Cover Member

According to the above-mentioned embodiment, the cover member is fixed to the frame member with the adhesive.

According to the other embodiments, the cover member may be fixed to the frame member in any manner, e.g., by using a screw or the like.

(f) Case Member

According to the above-mentioned embodiment, the case member has the anodized aluminum treatment at a portion other than the contact surface for contacting the frame member.

According to the other embodiments, the insulation of the case member may be realized in any manner other than the above, or the insulation may be omitted.

Further, the frame member may have an insulation treatment for a portion other than the contact surface for contacting the case member.

(g) Drive Unit

According to the above-mentioned embodiment, the rotating electric machine is a three phase brushless motor.

According to the other embodiments, the rotating electric machine may be any motor other than the three phase brushless motor.

Further, the rotating electric machine may not be only the motor (i.e., an electric motor) but a dynamo/generator, or may be a motor-generator that serves as a motor and a generator. Further, the winding may be provided not only in two systems, but also in three systems or more.

According to the above-mentioned embodiment, the drive unit is applied to the electric power steering device.

According to the other embodiments, the drive unit may be applied to devices other than the electric power steering device.

Such changes, modifications, and summarized schemes are to be understood as being within the scope of the present disclosure as defined by appended claims.

What is claimed is:

1. A drive unit comprising:
    a rotating electric machine having a stator with winding wound on the stator and with a shaft rotating within the stator, and a rotor rotatable relative to the stator;
    a controller holding member disposed on one end of the rotating electric machine;
    a controller having
        a substrate fixed to the controller holding member,
        a heat generation element mounted on a heat generation element mounting surface which is a controller holding member side surface of the substrate that enables heat dissipation from the heat generation element to the controller holding member, and
        electronic components mounted on an electronic component mounting surface of the substrate, opposite to the heat generation element mounting surface;
    a power supply connector connecting the substrate and a power supply; and
    a ground line coupled to a ground terminal of the power supply providing a conductive connection to the controller holding member via the substrate and the power supply connector.

2. The drive unit of claim 1, wherein
the electronic components include a capacitor serving as a filter circuit and a coil member, and
the coil member comprises a normal mode coil that reduces a normal mode noise.

3. The drive unit of claim 1, wherein
the rotating electric machine is further provided with a case member having the cylinder part that is disposed on a radius outside of the stator, and
the cylinder part and the ground line are conductively connected via the controller holding member, the substrate, and the power supply connector.

4. The drive unit of claim 3, wherein
the case member and the controller holding member are provided as separate bodies, and
the case member has a surface contact with the controller holding member, establishing conductivity between the case member and the controller holding member by the surface contact between a contact surface of the case member and a contact surface of the controller holding member.

5. The drive unit of claim 4, wherein
the case member and the controller holding member are conductively fixed with each other by a fixture member.

6. The drive unit of claim 5, wherein
the fixture member is provided at plural positions with a same interval in plural pieces.

7. The drive unit of claim 3, wherein
the controller holding member is integrally formed with the cylinder part.

8. The drive unit of claim 3, wherein
at least one of the case member and the controller holding member has an insulation treatment at positions other than a conduction part between the case member and the controller holding member.

9. The drive unit of claim 1, wherein
the heat generation element and the electronic components are arranged within a projection area of the cylinder part of the rotating electric machine along an axial direction.

10. An electric power steering device comprising:
a drive unit comprising:
    a rotating electric machine having a stator with winding wound thereon and with a shaft rotating therewith, and a rotor rotatable relative to the stator;
    a controller holding member disposed on one end of the rotating electric machine;

a controller having
- a substrate fixed to the controller holding member,
- a heat generation element mounted on a heat generation element mounting surface which is a controller holding member side surface of the substrate that enables heat dissipation from the heat generation element to the controller holding member, and
- electronic components mounted on an electronic component mounting surface of the substrate, opposite to the heat generation element mounting surface;

a power supply connector connecting the substrate and a power supply; and a ground line coupled to a ground terminal of the power supply providing a conductive connection to the controller holding member via the substrate and the power supply connector; and a power transmission section transferring a torque from the rotating electric machine to a drive object, so that the torque from the rotating electric machine drives the drive object to assist a steering operation of a steering wheel by a driver.

* * * * *